(12) United States Patent
Morgan et al.

(10) Patent No.: US 6,523,041 B1
(45) Date of Patent: Feb. 18, 2003

(54) DATA LINKING SYSTEM AND METHOD USING TOKENS

(75) Inventors: Charles Morgan, Little Rock, AR (US); Terry Talley, Conway, AR (US); John Talburt, Little Rock, AR (US); Charles Bussell, Alexander, AR (US); Ali Kooshesh, Little Rock, AR (US); Wally Anderson, North Little Rock, AR (US); Kari Johnston, Benton, AR (US); Richard Farmer, Benton, AR (US); Ray Hashemi, Little Rock, AR (US); Mike Dobrovich, Little Rock, AR (US); Russell Baxter, Conway, AR (US); Melissa K. Ward, Conway, AR (US); Jeannie K. Ratliff, Conway, AR (US); James E. Mooney, Conway, AR (US)

(73) Assignee: Acxiom Corporation, Little Rock, AR (US)

( * ) Notice: Subject to any disclaimer, the term of this patent is extended or adjusted under 35 U.S.C. 154(b) by 0 days.

(21) Appl. No.: 09/469,096

(22) Filed: Dec. 21, 1999

Related U.S. Application Data

(63) Continuation-in-part of application No. 08/902,567, filed on Jul. 29, 1997.

(51) Int. Cl.[7] ............................................... G06F 17/30
(52) U.S. Cl. ...................................................... 707/102
(58) Field of Search .............................. 707/2, 3, 4, 5, 707/6, 8, 10, 102, 103 R, 100, 201, 101, 503, 517; 705/16, 27, 37; 709/227, 246

(56) References Cited

U.S. PATENT DOCUMENTS 4,528,643 A    7/1985   Freeny, Jr.
4,933,848 A    6/1990   Haderle et al.
5,291,583 A    3/1994   Bapat
5,495,609 A    2/1996   Scott
5,530,854 A    6/1996   Emery et al.
5,603,025 A    2/1997   Tabb et al.
5,613,012 A    3/1997   Hoffman et al.

(List continued on next page.)

FOREIGN PATENT DOCUMENTS

WO        WO 01/46862 A1    6/2001

OTHER PUBLICATIONS

"Red Brick Systems Unveils Data Mining Strategy; Plans to Provide Data Warehousing, Data Mining Capabilities in Single, Integrated RDBMS Engine," PR Newswire, pp. 610SJM002, (Jun. 10, 1996).

"Maximizing Your Warehouse," Information Week, p. 42, (Mar. 18, 1996).

*Primary Examiner*—Diane D. Mizrahi
*Assistant Examiner*—Apu M Mofiz
(74) *Attorney, Agent, or Firm*—J. Charles Dougherty

(57) ABSTRACT

A method for linking data using permanent tokens is disclosed. The tokens may be used to link data pertaining to a consumer, a business, an address, an occupancy, or a household. The tokens are created in a central repository, which maintains an identification class for each entity. The identification class contains all available information concerning the entity. The tokens may be applied to a data storage system to allow real-time construction of a total customer view. The tokens may also be used to link the data storage system to a repository, such that the total customer view contains all available information concerning the customer. The total customer view may be used to formulate a response to customer input, such as a purchase or access to an Internet web page maintained by the data owner. By matching tokens instead of names and addresses, potential ambiguities and erroneous duplicates are eliminated. Data updates may be performed incrementally, and may be pushed from the repository to the data owner as new information is received.

30 Claims, 15 Drawing Sheets

U.S. PATENT DOCUMENTS

| | | |
|---|---|---|
| 5,692,132 A | 11/1997 | Hogan |
| 5,706,495 A | 1/1998 | Chadha et al. |
| 5,754,772 A * | 5/1998 | Leaf .......................... 707/10 |
| 5,765,028 A | 6/1998 | Gladden |
| 5,767,854 A | 6/1998 | Anwar |
| 5,794,229 A | 8/1998 | French et al. |
| 5,799,300 A | 8/1998 | Agrawal et al. |
| 5,809,478 A | 9/1998 | Greco et al. |
| 5,870,753 A | 2/1999 | Chang et al. |
| 5,890,154 A * | 3/1999 | Hsiao et al. .................... 707/2 |
| 5,966,695 A | 10/1999 | Melchione et al. |
| 6,058,378 A * | 5/2000 | Clark et al. ................... 705/37 |

* cited by examiner

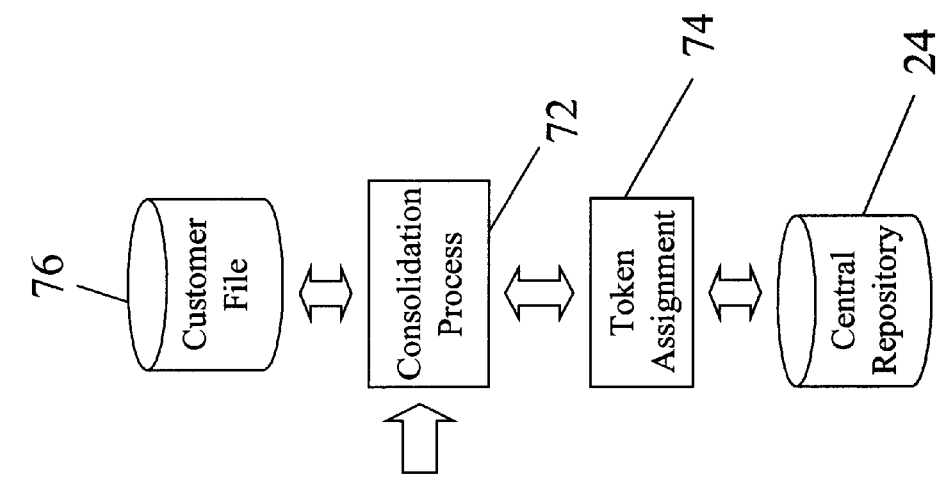
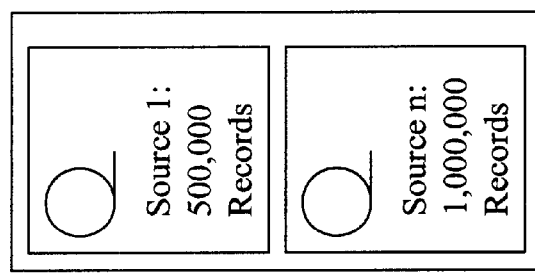
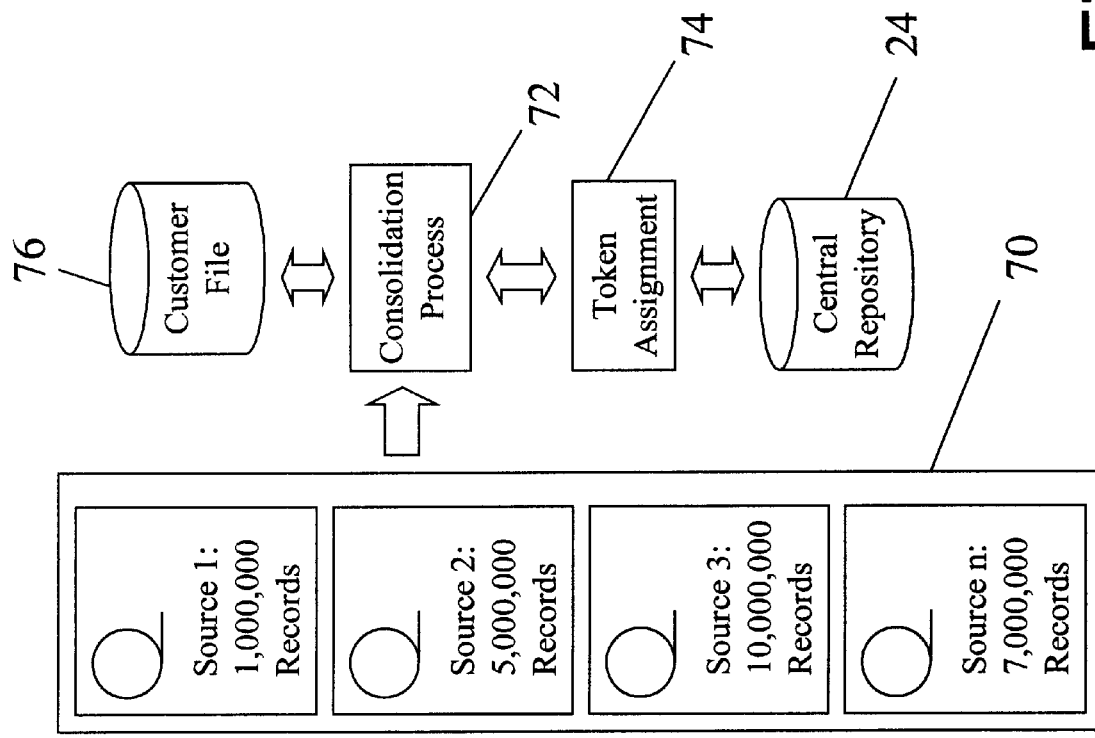
Fig. 9

| System of Record | Name | Address | Account Number | Date Updated |
|---|---|---|---|---|
| Automotive Services | Bill Smith | 978 Frankfort, Franklin, TN | 111-1111 | 06/17/95 |
| Home Services | William F Smith | 10 Oak Street, Jacksonville Florida | 222222-33 | 02/25/99 |
| Retail Sales | Frank Smith | 978 Frankfort, Franklin TN | 777-998-777 | 08/14/97 |
| Sporting Goods Special Mailing List | Spud Smith | 22 Chamberlin Dr, Apt 110, Jacksonville FL | 333-22222222 | 12/15/98 |

| Consumer Token | Address Token | System of Record | Name | Address | Account Number | Date Updated |
|---|---|---|---|---|---|---|
| 2540192837465 | 2539998776655 | Automotive Services | Bill Smith | 978 Frankfort, Franklin, TN | 111-1111 | 06/17/95 |
| 2540192837465 | 2531122233344 | Home Services | William F Smith | 10 Oak Street, Jacksonville Florida | 222222-33 | 02/25/99 |
| 2540192837465 | 2539998776655 | Retail Sales | Frank Smith | 978 Frankfort, Franklin TN | 777-998-777 | 08/14/97 |
| 2540192837465 | 2537776668888 | Sporting Goods Special Mailing List | Spud Smith | 22 Chamberlin Dr, Apt 110, Jacksonville FL | 333-22222222 | 12/15/98 |

DATA LINKING SYSTEM AND METHOD USING TOKENS

This application is a continuation-in-part of patent application Ser. No. 08/902,567, filed Jul. 29, 1997.

FIELD OF THE INVENTION

The invention is directed to a system and method for linking data that pertains to like entities. In particular, the invention is directed to a system and method for linking data pertaining to consumers, businesses, addresses, occupancies, and households using permanent, universally unique tokens.

BACKGROUND OF THE INVENTION

Virtually all businesses today find it necessary to keep computerized databases containing information about their customers. Such information can be used in a variety of ways, such as for billing, and for keeping consumers informed as to sales and new products. This information is typically stored electronically as a series of records in a computer database, each record pertaining to a particular customer. Records are logical constructs that may be implemented in a computer database in any number of ways well known in the art. The database used may be flat, relational, or may take any one of several other known forms. Each record in the database may contain various fields, such as the customer's first name, last name, street address, city, state, and zip code. The records may also include more complex demographic data, such as the customer's marital status, estimated income, hobbies, or purchasing history.

Businesses generally gather customer data from a multitude of sources. These sources may be internal, such as customer purchases, or external, such as data provided by information service providers. A number of information service providers maintain large databases with broad-based consumer information that can be sold or leased to businesses; for example, a catalog-based retail business may purchase a list of potential customers in a specific geographic area.

Because businesses use varying methods to collect customer data, they often find themselves with several large but entirely independent databases that contain redundant information about their customers. These businesses have no means by which to accurately link all of the information concerning a particular customer. One common example of this problem is a bank that maintains a database for checking and savings account holders, a separate database for credit card holders, and a separate database for investment clients. Another common example is a large retailer that has separate databases supporting each of its divisions or business lines, which may include, for example, automotive repair, home improvement, traditional retail sales, e-commerce, and optometry services.

Businesses with multiple, independent databases may find it particularly valuable to know who among their customers come to them for multiple services. For example, a bank may wish to offer an enhanced suite of banking services to a customer that maintains only $100 in his or her savings account, if the bank could also determine that this same individual maintains a $100,000 brokerage account. This information could also be valuable, for example, to take advantage of cross-selling opportunities and to assist the business in optimizing the mix of services to best serve its existing customer base.

Linking all available data concerning each customer would also allow each of the business's divisions to have access to the most up-to-date information concerning each customer. For example, a customer may get married and relocate, then notify only one of the business's divisions concerning the change. Suppose that Sue Smith, residing in Memphis, becomes Sue Thompson, residing in Minneapolis. If only one of the business's data processing systems "knows" about the change, the other systems would be unable to determine that "new" customer Sue Thompson in Minneapolis is the same person as existing customer Sue Smith in Memphis.

One of the oldest methods used to combat this problem is simply to assign a number to every customer, and then perform matching, searching, and data manipulation operations using that number. Many companies that maintain large, internal customer databases have implemented this type of system. In theory, each customer number always stays the same for each customer, even when that customer changes his or her name or address. These numbers may be used internally, for example, for billing and for tracking packages shipped to that customer. The use of a customer identification number eliminates the potential ambiguities if, for example, the customer's name and address were instead used as identifiers. Financial institutions in particular have used personal identification numbers (PINs) to unambiguously identify the proper customer to which each transaction pertains.

Customer number systems are inherently limited to certain applications. Customer identification number are not intended to manage a constantly changing, nationwide, comprehensive list of names and addresses. Companies maintaining these numbers are generally only interested in keeping up with their own customers. Thus the assignment process for such numbers is quite simple—when a customer approaches the company seeking to do business, a new number is assigned to that customer. The customer numbers are not the result of a broad-based process capable of managing the address and name history for a given customer. Also, the customer numbers are assigned based only on information presented to the business creating the numbers. The numbers are not assigned from a multi-sourced data repository that functions independently of the company's day-to-day transactions. In short, the purpose of such numbers is simply transaction management, not universal data linkage. Such numbers are also not truly permanent, since they are typically retired by the company after a period of inactivity. Again, since the focus of the customer number assignment scheme is merely internal business transactions, there is no reason to permanently maintain a number for which no transactions are ongoing. These numbers cannot be used externally to link data because every company maintains a different set of customer numbers.

Although externally applied, universal numbering systems have not been used for consumers, they have been made publicly available for use with retail products. The universal product code (UPC) system, popularly known as "bar codes," began in the early 1970's when a need was seen in the grocery industry for a coding system that was common to all manufacturers. Today, the Uniform Code Council, Inc. (UCC) is responsible for assigning all bar codes for use with retail products, thereby maintaining a unique UPC number for every product regardless of the manufacturer. A database of these codes is made publicly available so that the codes can be used by everyone. Using this database, every retailer can track price and other information about each product sitting on its shelves. Today's product distribution chains also rely heavily on the UPC system to track products and make determinations concerning logistics and distribution channels.

While the UPC system has been enormously successful, the system's usefulness is limited. To obtain a UPC number for a new product, a manufacturer first applies for a UPC number, the product and number are added to the UCC database, and then the manufacturer applies the proper bar coding to its products before they are distributed. There is no scheme for assigning UPC numbers to pre-existing products, and no scheme for matching UPC numbers to the products they represent. Also, since each UPC number represents a single, distinct item packaged for retail sale, there is no scheme for identifying the various elements of a particular product to which a single UPC number is assigned. The UPC system thus could not be used to link various pre-existing data pertaining to consumers and addresses.

A final but vitally important issue raised by the use of any identification number system with respect to individuals is privacy. A company's internal-only use of a customer identification number raises few privacy concerns. But the external use of a customer number or PIN with respect to an individual increases the risk that the individual's private data may be easily shared in an unauthorized or illegal manner. The potential for misuse thus makes customer number systems unacceptable solutions for an information service provider seeking to develop an externally-distributed linking system for data pertaining to the entire United States consumer population.

Given the limitations of identification number systems, the only comprehensive method to eliminate duplicates and link (or "integrate") customer data maintained on separate databases has historically been to rebuild the relevant databases from scratch. Since many such databases contain tens of millions of records, the cost of completely rebuilding the databases is often prohibitively expensive. In addition, these databases are constantly in flux as old customers leave, new customers take their place, and customer information changes; thus the rebuild procedure must be periodically repeated to keep all information reasonably current.

Businesses have traditionally turned to information service providers for data integration and duplicate elimination services. The information services industry has devoted enormous resources in recent years to developing various "deduping" solutions. These solutions are performed after-the-fact, that is, after the instantiation of the duplicate entries within the data owner's system. To determine if data records for Sue Smith in Memphis and Sue Thompson in Minneapolis pertain to the same person, a deduping routine may analyze a myriad of data fields; simply comparing names and addresses will fail to achieve a match. Even in the case where the name and address are the same, this may not indicate that the records pertain to the same individual, since, for example, the data may pertain to a father and his namesake son. The fact that many databases contain largely incomplete data makes this problem even more difficult to solve, and in many cases makes a complete solution impossible.

Although deduping routines are necessarily complex, they must also be performed with great speed. These routines are used to dedupe databases having tens of millions of records. With such large databases, the software subroutine that performs the deduping function may be called millions of times during a single deduping session. Thus these subroutines must be executed on very fast, expensive computer equipment that has the necessary power to complete the deduping routine in a reasonable amount of time. Because duplicate elimination is so resource-intensive, such tasks are today performed only by information service providers or data owners that have access to the massive computing power necessary to efficiently perform these routines.

In addition, deduping routines necessarily involve some guesswork. As explained above, duplicate elimination is based on the available data, which may be incomplete. The results of duplicate elimination routines are thus only as good as the available information. Because of the inherent ambiguities in name and address information, no system can eliminate 100% of the duplicates in a customer database; inevitably, the resulting database will contain instances of multiple records for the same customer, and multiple customers merged into one record as if they were a single customer.

Historically, the procedure by which an information service provider integrates a business's databases has been time consuming and labor intensive. Since a wide variety of database formats are in use, the information service provider must first convert the database source files to a standard format for processing. The information service provider then runs one of the complex deduping programs as explained above. The data in the business's databases may be augmented with external sources of information to improve the accuracy of the deduping routines. The resulting database file is then reformatted into the business's database file format to complete the process. This entire procedure requires significant direct involvement by the information service provider's technical personnel, which is an important factor in the cost of the service.

A significant limitation of this data integration method is that each time the service is requested, the entire process must be repeated. Data integration cannot be performed for a single record at a time, or for only those records that have been updated. This is because the data integration process depends upon the comparison of all of the data records against each other to establish groupings of similar records. Although matching links are usually created during the comparison process, those links are temporary and are lost once the process is complete. The links must be recreated from scratch each time the service is performed. It would be impossible to reuse these links since they are not unique across the universe of all possible customers, and are not maintained by the information services provider.

One of the most significant limitations of the current data integration method is that it cannot be performed in real time; the process is only performed in batch mode. Real-time data integration would be highly desirable since it would allow a retailer or other data owner to provide an immediate, customized response to input for a particular customer. For example, when a particular customer visits a retailer's web site, it would be desirable to link all available information concerning that customer, and then display a web page that is particularly tailored to that customer's interests and needs. Another application would be to provide customized coupons or sales information in response to the "swiping" of a particular customer's credit card when a retail purchase is in progress.

Prior-art systems to provide a customized response to customer input are based on the matching of internal customer numbers. For example, some grocery stores distribute "member" cards containing bar codes to identify a particular customer. When the customer presents his or her member card at the check-out line, the card's bar code is scanned to determine the customer's identification number. The grocer's data processing system then automatically consults its buying history database in order to print coupons that are tailored to that customer's particular buying habits.

Record-at-a-time processing based on internal customer numbers has several important limitations. First, this system only works for established customers for whom a number has already been assigned. If a new customer enters the store, that customer must be issued a member card (and corresponding customer identification number) before the system will recognize the customer. Initially, the grocer would know nothing about this customer. In addition, this system's use of customer identification numbers would make it unacceptable for use externally, due to the individual privacy concerns discussed above.

Still another limitation of traditional data integration methods is that they provide no means by which a business can remotely and automatically update or "enhance" the data it maintains for each customer when the data concerning that customer changes. The traditional, batch-mode method of providing update or enhancement data is laborious, and may require several weeks from start to finish. First, the company requesting data enhancement is required to build an "extract file" containing an entry for each record in its customer database. This extract file is stored on a computer-readable medium, such as magnetic tape, which is then shipped to the information service provider for enhancement. Since a wide variety of database formats are in use, the information service provider must first convert the extract file to the information service provider's internal format for processing. Using this standardized version of the extract file, the information service provider then executes a software application that compares the information in the company's database against all of the information that the information service provider maintains. The update or enhancement data is then overlaid onto the company's standardized extract file.

An important limitation of this data update and enhancement method is that the business's database must be rebuilt even when it only requires an update to a small portion of the data. For example, a retailer may desire to update the addresses in its customer database once per month. Most customers will not have changed their address within each one-month period; the traditional update method, however, would require the retailer to completely rebuild the database to catch those few customers who have moved.

For all of these reasons, it would be desirable to develop an unambiguous data-linking system that will improve data integration, update, and enhancement; will perform record-at-a-time, real-time data linking; and may be used externally without raising privacy concerns.

SUMMARY OF THE INVENTION

The present invention is directed to a system and method for using permanent "tokens" to create an unambiguous linking scheme to match related data. Tokens may be implemented as unique numbers that are used to tag all data pertaining to a particular entity. These tokens are created by an information services provider, and may be distributed externally for the use of its customers. Unlike the customer identification numbers discussed above, the creation of tokens is not dependent upon a customer approaching the data owner. The information services provider that creates the tokens may maintain databases with information pertaining to the entire United States population, and constantly monitors the population for changes of address, name, status, and other demographic data in order to keep the list of tokens current. New tokens are assigned as new entities are identified.

To maintain the uniqueness of each token, the tokens are created only by a single central repository operated by the information services provider. Temporary tokens may be created initially when a new entity is encountered, so that the information services provider may collect additional data to confirm that the supposed new entity is not already in the database. Once the information services provider confirms that the entity is actually new, however, a permanent token will be assigned that will be used to link data pertaining to that entity for all time. Because even the information service provider's information will not be complete, it may be necessary to periodically perform token maintenance in the form of combining two or more tokens into a single token, or splitting a single token into two different tokens. This process may be performed simply by publishing a list of consolidated and split tokens that is transmitted to all token users. This maintenance method makes unnecessary the complete reprocessing of a database to keep tokens current.

Because the tokens are created at a central repository that is maintained by an information services provider, ambiguities may be resolved far more effectively than in prior art systems. The central repository may create an identification class that contains all available data pertaining to each entity for which information is maintained. The purpose of the identification class is to link all available data concerning a particular entity using the appropriate token. Even though much of this information may never be distributed, it may still be used in the matching process to assure that the correct token is assigned to a customer's data in response to a data integration, update, or enhancement request. The identification class may include name aliases, common name misspellings, last name change history, address history, street aliases, and other relevant information useful for matching purposes. The identification-class structure enables far more accurate matching and "deduping" than previously possible; for example, by using known name aliases, the central repository may recognize that a customer's separate database records for "Sue C. Smith," "Carol Smith," and "Sue Thompson" each actually refer to the same person, and would accurately assign a single token to link all relevant information about this person.

Since the tokens are permanent and are universally unique, they are not limited to use by a particular data provider, or to a particular matching session; instead, the tokens are specifically intended for external distribution to any owner of relevant data, and will never expire. Once a data owner receives the tokens and matches them to its existing data, the tokens can be used to rapidly compare, match, search, and integrate data from multiple internal databases, either in batch mode or real time, using as few as one record at a time.

Different types of tokens may be used to link data relevant to, for example, customers, businesses, addresses, households, and occupancies. An occupancy token links information about a customer or business and the address at which that particular customer resides at a particular time. A household token links information about all persons who are determined to share a household. The definition of what constitutes a "household" may vary from one application to another; therefore, there may be multiple types of household tokens in use simultaneously. A series of linked address tokens can further be used to maintain an individual's address history. Using an address history, ambiguities caused by name similarity between individuals may be more easily resolved, and the correct token will be tagged to that individual's data despite a change in address.

As noted above, prior art "deduping" routines are complex, resource-intensive, and, because they are limited to the available data, cannot perform with 100% accuracy. With the present invention, however, adding new data to a data processing system is as simple as matching tokens against one another. Token matching is a computationally simple process that can be performed as the data is added to the data processing system in real time. Because no inadvertent duplicates are added to the database during data update or enhancement, periodic efforts to remove duplicates are unnecessary.

The present invention also uses tokens to greatly simplify the process of data integration where multiple databases are maintained. When all known information about a particular entity is required, the data owner need only search each database for information that is linked by the token associated with the entity of interest. There is no need to perform complex matching algorithms designed to determine whether, for example, two customers about whom information is maintained on separate databases are in fact the same individual. The tokens thus enable the data owner to treat each of its physically remote databases as if they were a single "virtual" database in which all information about a particular entity is readily accessible.

The use of tokens for linking data also significantly reduces the privacy concerns related to data enhancement, data integration, and related data processing. Once the appropriate tokens are matched to the data owner's data, update and enhancement requests may be transmitted to an information services provider as simply a list of tokens. The tokens themselves contain no information concerning the data to which they pertain. Thus anyone who clandestinely intercepts such a transmission would be unable to extract any private data from the transmission. In addition, since the tokens are merely data links, and not PINs or customer identification numbers, there is no increased individual-privacy risk associated with the external use of the tokens.

The tokens further allow real-time, record-at-a-time linking for the immediate collection of all relevant data in response to customer input. By collecting all data for a particular customer, the data owner is able to construct a "total customer view" that may be used, for example, to customize the interaction between the data owner and its customer. If multiple databases must be consulted to retrieve all relevant customer data, then each database need only be searched for data linked to the relevant token. The data owner can use the tokens to link all of its own data, or can link with data maintained by an information services provider to immediately enhance its data pertaining to a particular customer. Because the linking process is performed just at the moment when the customer input is received, the data retrieved will be the most recently updated customer information available. The linkage between the data owner's database and information provider's database may be by OLTP (on-line transactional processing) using the linking tokens. This linkage may also be used to perform "trigger notification." Trigger notification is the automatic triggering of update messages to every linked database when new information is received about a particular entity. Using tokens, trigger notification may taken place almost instantaneously, allowing, for example, every division of a large retailer to take advantage of the latest information received from a customer.

Another advantage of the record-at-a-time processing is that data may be "pushed" from the information services provider to its customers. For example, the information services provider may learn that a particular individual's name has changed. This change can be "pushed" to a customer's database automatically through the use of a message that contains the new information and the token used to link all data pertaining to this individual. Because the update process requires only the matching of tokens, the process may be performed automatically without direct intervention by either the information services provider or its customer.

One concern that arises in connection with an information service provider's external distribution of data is the inadvertent distribution of one company's data to that company's competitor. For example, company A may wish to link its data using tokens. The information service provider may already have information in its matching database about company A's customers that was obtained from company B, company A's competitor. The information services provider must be able to assure company B that its private data will not be distributed to company A. The use of tokens in the present invention, however, makes this "screening" process automatic. The information services provider may use the data of both companies as part of its internal token creation and linkage processes. But by returning only the information received from a company along with the linked tokens, the company receiving the tokens does not obtain anyone's data but its own. Because the tokens themselves reveal no private company information, there is no requirement to implement a separate "screening" function. Also, because the information service provider uses all available data to generate and link tokens, the correct tokens may still be distributed to companies with incomplete or partially inaccurate data.

It is therefore an object of the present invention to provide a data processing system using permanent tokens.

It is a further object of the present invention to provide a data processing system using tokens that are universally unique.

It is a still further object of the present invention to provide for the integration of data across multiple internal databases using tokens.

It is also an object of the present invention to provide for automatic duplicate elimination on a database using tokens.

It is another object of the present invention to provide for data update and enhancement using tokens.

It is still another object of the present invention to provide real-time, record-at-a-time processing of data using tokens.

It is still another object of the present invention to provide linkage capability for the creation of a total customer view from physically separate databases in real time using tokens.

It is still another object of the present invention to create a customized response to customer input in real time using tokens.

It is still another object of the present invention to perform trigger notification using tokens.

It is still another object of the present invention to automatically push update data from a central repository to a customer database using tokens.

Further objects and advantages of the present invention will be apparent from a consideration of the following detailed description of the preferred embodiments in conjunction with the appended drawings as briefly described following.

BRIEF DESCRIPTION OF THE DRAWINGS

FIG. 9 is a diagram illustrating the difference between processing an initial assignment of tokens to a customer database and a subsequent update of token information to the same database according to a preferred embodiment of the present invention.

FIG. 10 is a table of typical data for a retailer with several business divisions prior to tagging with tokens according to a preferred embodiment of the present invention.

FIG. 11 is a table of typical data for a retailer with several business divisions after tagging with tokens according to a preferred embodiment of the present invention.

DETAILED DESCRIPTION OF THE PREFERRED EMBODIMENTS

Figure 1:
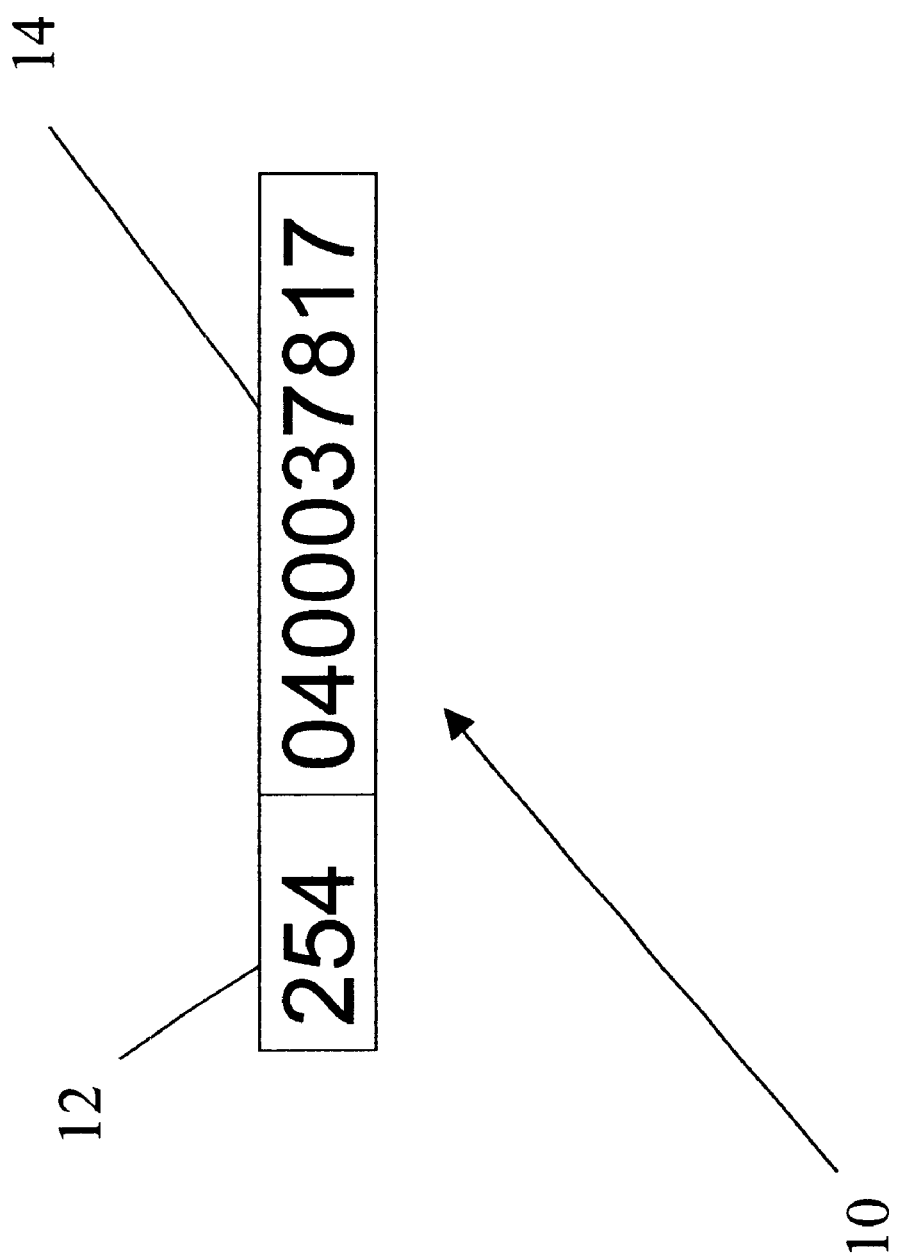
FIG. 1 is a diagram showing the structure of the data-linking tokens according to a preferred embodiment of the present invention.

Referring now to FIG. 1, the structure of the tokens used in a preferred embodiment of the invention is shown. Each token 10 may be stored electronically as a number or code. Token 10 is made up of prefix 12 and unique number 14. Prefix 12 preferably has a decimal value between 0 and 255, and thus may be represented by a single byte on a computer storage medium. The value of prefix 12 represents the type of entity for which token 10 links all relevant information. For example, a prefix 12 value of "254" may indicate that token 10 is used to link information about a consumer, while a prefix value of "253" may indicate that token 10 is used to link information about an address.

Unique number 14 preferably may be represented by four bytes on a computer storage medium, and thus may have a decimal value between 0 and 4,294,967,294. Unique number 14 must be unique for each token 10 that has the same prefix 12, such that no token 10 will be identical to any other token 10. Preferably, unique number 14 is generated using counters, and is sequentially assigned to new tokens 10 as they are generated. Any alternative method may be used to generate unique number 14 so long as the uniqueness of each token 10 is maintained.

In alternative embodiments, prefix 12 and unique number 14 may be of any size, and may be combined in any order to form token 10. The invention is not limited to a token 10 in which prefix 12 necessarily precedes unique number 14; the term "prefix" should not be read in such a narrow fashion. Token 10 may also include additional fields.

Figure 2:
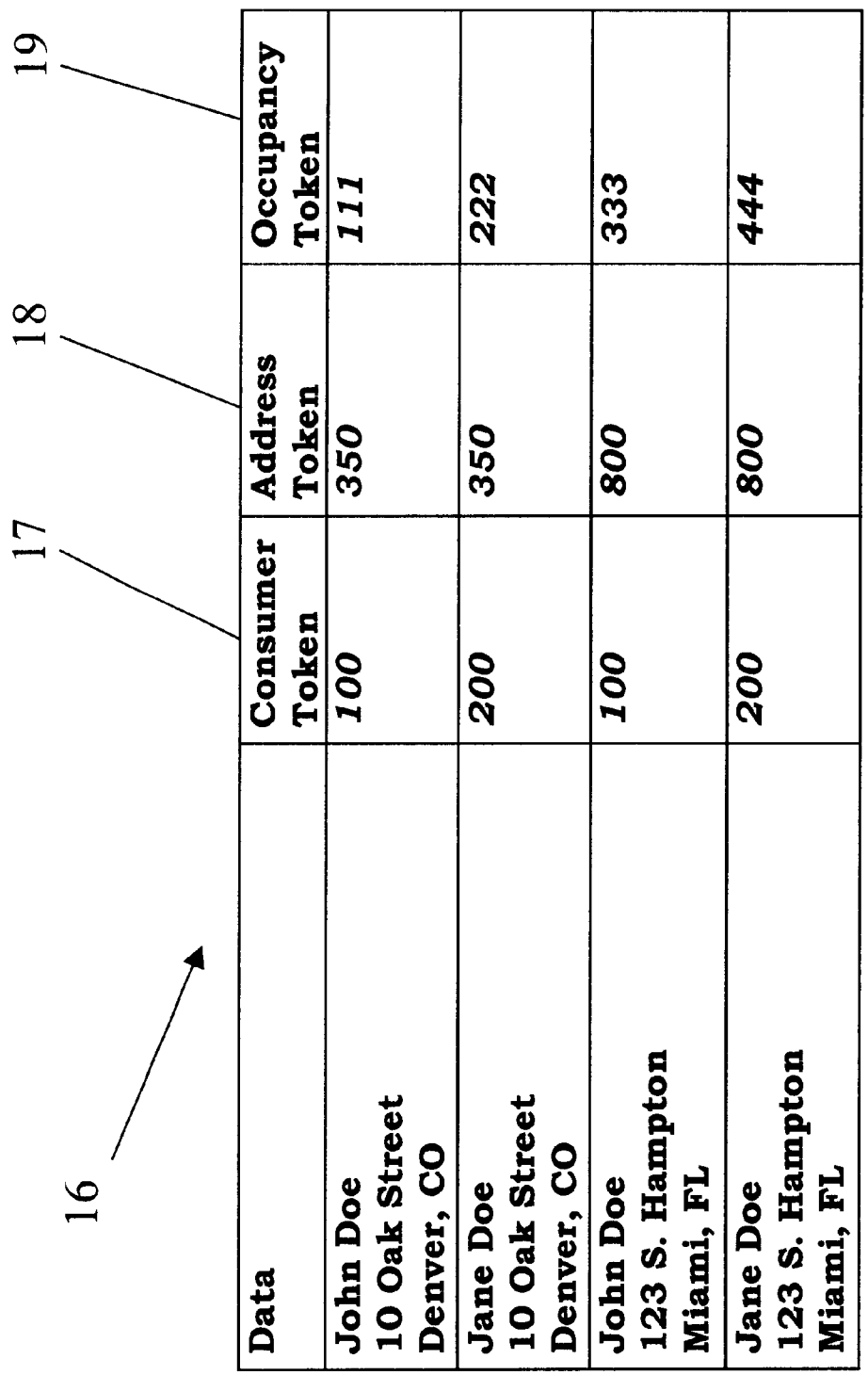
FIG. 2 is a table illustrating the relationship between customer, address, and occupancy tokens according to a preferred embodiment of the present invention.

FIG. 2 illustrates the relationship between consumer, address, and occupancy tokens using a specific example. Table 16 shows data relative to a husband and wife the first two rows showing their name and address data when they live in Denver, and the last two rows showing their name and address data after they move to Miami. (In this example, only an abbreviated portion of the unique number 14 of each token 10 is shown for clarity). As consumer token column 17 demonstrates, the consumer tokens do not change for each of these persons as they move. These persons are associated with new address tokens, however, as shown in address token column 18. Occupancy token column 19 demonstrates that the occupancy token association also changes, as these tokens are used to link information about each of these persons and their address at a particular period of time.

Figure 3:
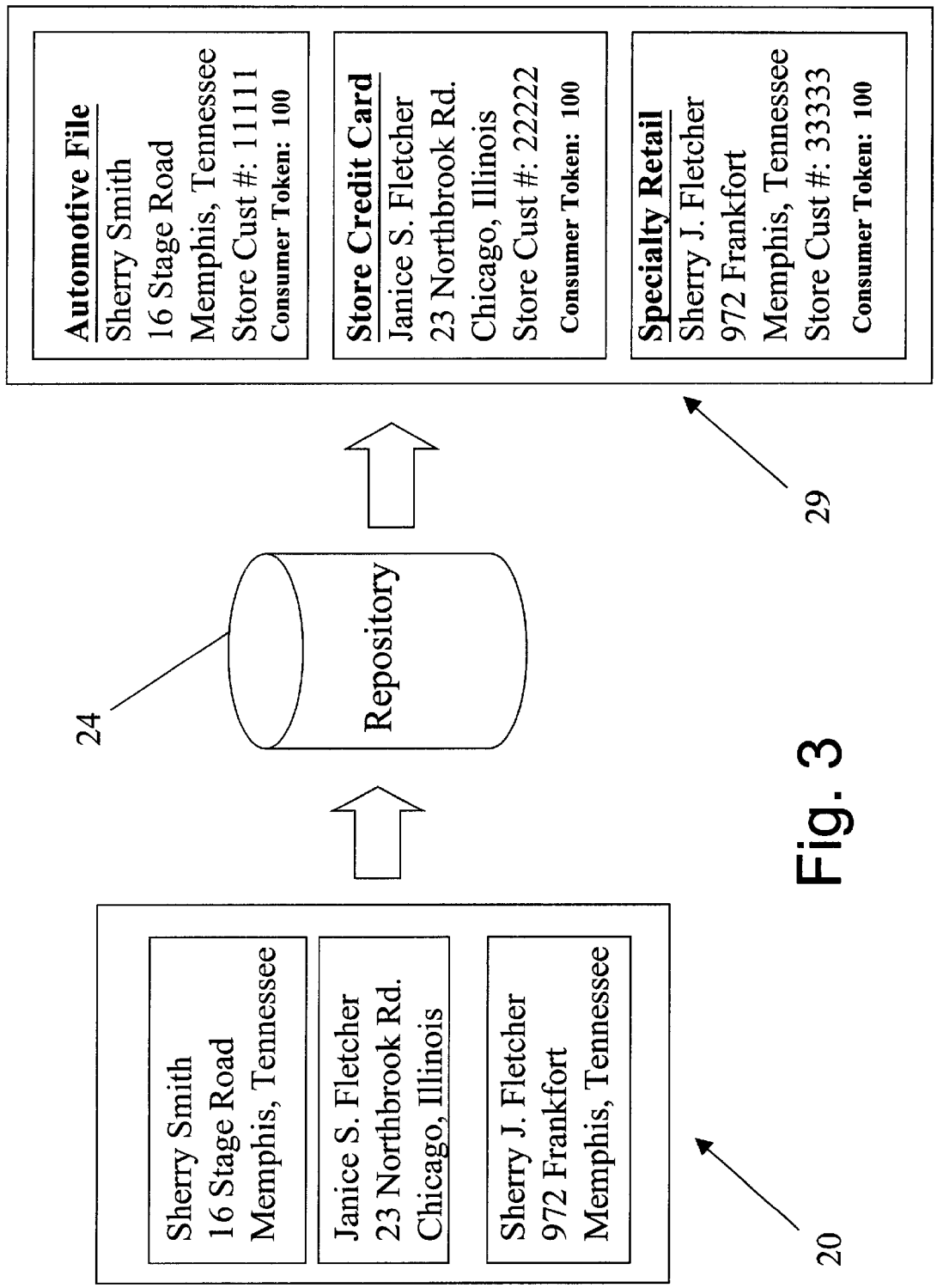
FIG. 3 is a diagram illustrating the results of applying the linking tokens to a retailer's customer database according to a preferred embodiment of the present invention.

Before a data owner may link its data using tokens 10, tokens 10 must be associated with the data on the database or databases of interest. This initial association is performed by an information services provider. In addition to associating each token 10 with the appropriate data, this process may be used to eliminate duplicates in the relevant database files. Referring now to FIG. 3, an overview of this process is illustrated. Input file 20 is generated which contains each record from the relevant database files maintained by the data owner. Input file 20 may be drawn from a single database, or from multiple independently maintained databases. Input file 20 in the illustrated example shows information about the same customer that is drawn from three separately maintained databases. In this example, simple matching based on name and address would be unable to resolve that this is the same customer, since the customer has moved and changed her name during the period when these separate databases were keeping records. By using repository 24, however, the information services provider is able to determine that each of these records contains data pertaining to a single customer. Thus each record in result file 29 contains the same token 10 for this consumer, and the data owner will now be able to access all of its data concerning this consumer simply by searching for all data linked by this particular token 10.

Figure 4:
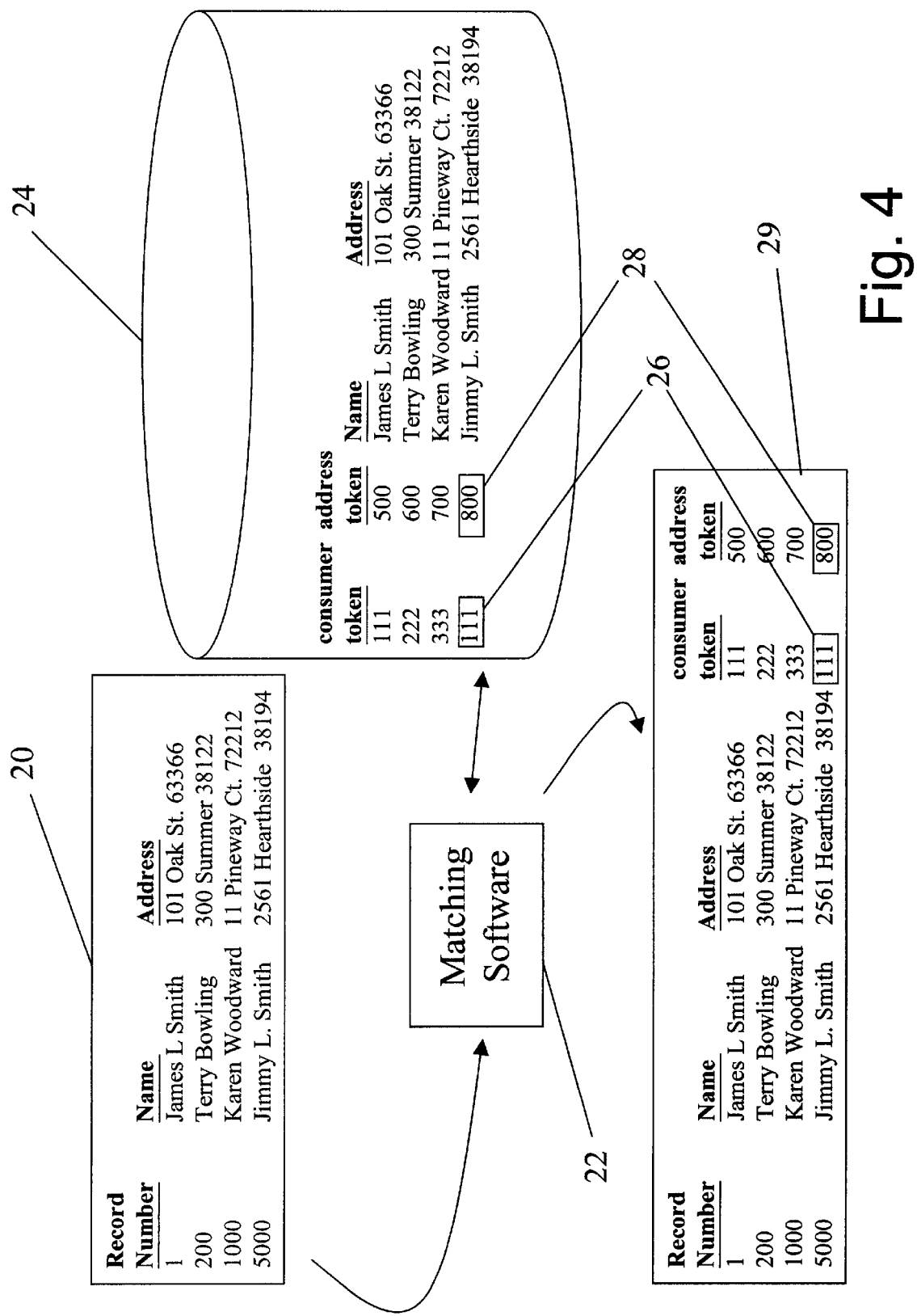
FIG. 4 is a diagram illustrating the procedure for applying linking tokens to a customer database according to a preferred embodiment of the present invention.

Referring now to FIG. 4, a more detailed description of the token assignment process is illustrated. The first step in the token association process is to form input file 20 as described above. Input file 20 is then fed into matching software 22, which may be executed on computer equipment maintained by the information services provider, but may also be executed on the data owner's own equipment. Matching software 22 then compares data from input file 20 with data from repository 24 to find matches.

Repository 24, which is maintained by the information services provider, contains broad-based information concerning consumers and addresses on a nationwide scale. Repository may be a single physical database, or may consist of a number of physically independent databases linked by a communications network. Preferably, repository 24 will contain information pertaining to virtually all consumers living in the United States or other area of interest.

Figure 5:
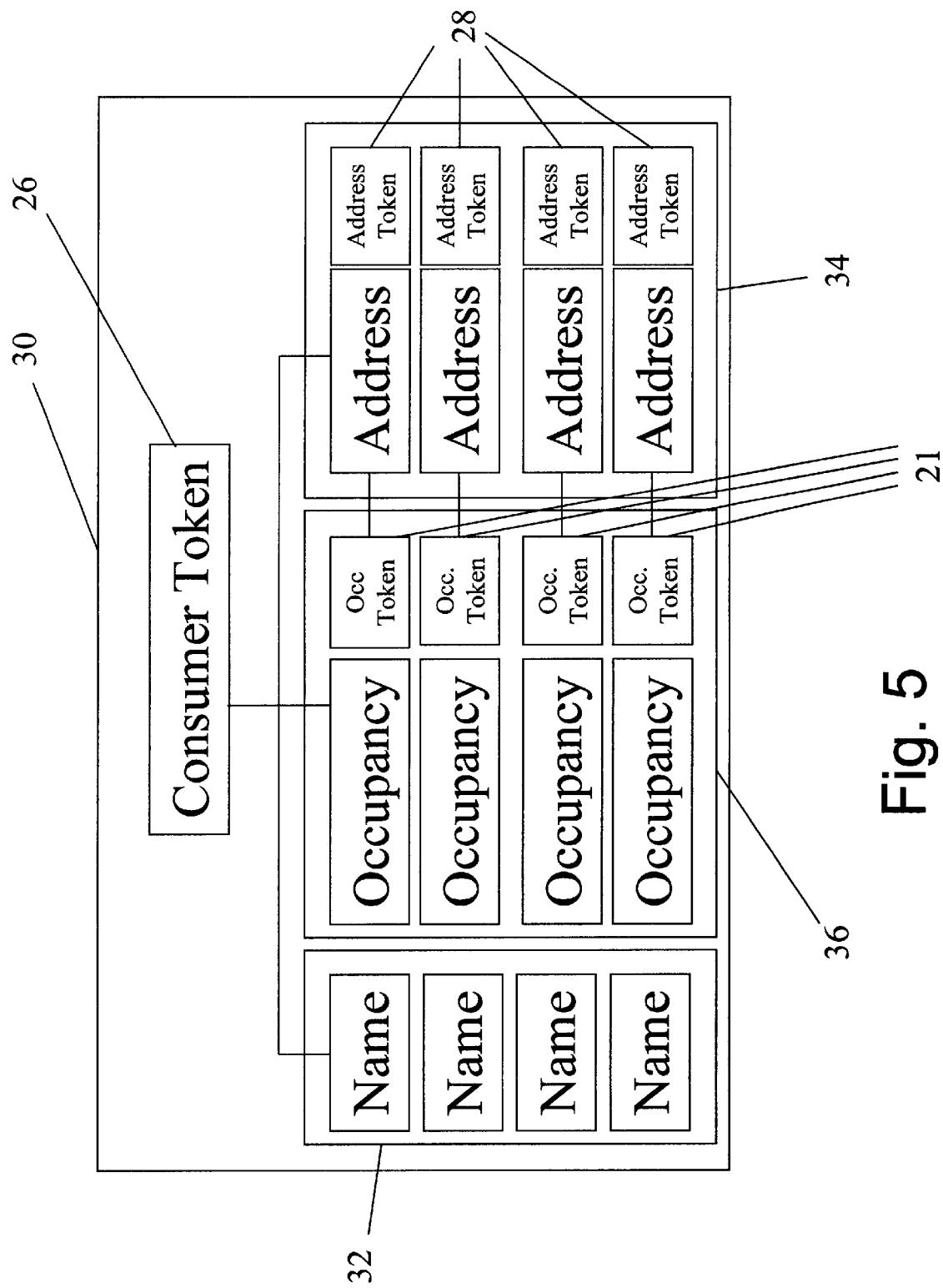
FIG. 5 is a diagram showing the structure of the identification class object resident on the information service provider data repository according to a preferred embodiment of the present invention.

Referring now to FIG. 5, information is stored in repository 24 in the form of identification class 30. Each identification class 30 contains all information available concerning a particular individual, which is linked using consumer token 26. In particular, identification class 30 may contain name history 32, which is a list of the current and former names used by the individual; address history 34, which is a list of addresses at which the individual has resided; and occupancy history 36, which includes the occupancy tokens 21 associated with each name/address correlation for a particular period of time. Address history 34 may be used to build occupancy history 36, since, as noted above, an occupancy is the combination of an individual's name at a particular time and the address at which that individual resided at that time. Address history 34 may also include an address token 28 for each address in address history 34. Name history 32 and address history 34 allow matching software 22 to perform correct matching of data with tokens 10 even when an individual has changed both his or her name and address. Identification class 30 may also contain various sorts of demographic information concerning the particular individual to which it pertains. This additional information may also be used by matching software 22 for comparison. Identification class 30 may also contain common name and address misspellings as part of or separate from name 32 and address history 34.

Referring again to FIG. 4, the process of attaching tokens to the corresponding data in input file 20 after matching software 22 has completed the matching process is described. As explained above, each identification class 30 includes a consumer token 26 and at least one address token 28. (Where identification class 30 contains past addresses in address history 34, additional address tokens 28 may be linked to those past addresses.) As a result of the execution of matching software 22, input file 20 is rewritten to include the correct consumer token 26 and address token 28 as part of each record. Result file 29, which consists of input file 20 augmented with consumer tokens 26 and address tokens 28, is then returned to the data owner. Duplicate elimination is automatically performed in this process, since the result file 29 will have identical consumer tokens 26 for each record that contains information referring to the same individual. For example, result file 29 contains records for "James L. Smith" and "Jimmy L. Smith," but since each record is matched to the same consumer token 26, the data owner may now easily determine that both records refer to the same customer.

Input file 20 and result file 29 may be transmitted in any manner suitable for the transmission of electronic files. Preferably, the files may be transmitted between the data owner and information service provider using FTP (file transfer protocol) techniques through a telecommunications network, or may be physically transferred on electronic storage media such as magnetic tape or disks. Since the matching software 22 relies upon the comprehensive data in repository 24 for matching, rather than on similarities contained within the input file 20 itself, there is no limit on the minimum size of input file 20. Input file 20 may be as small as a single record with no loss in the accuracy of the matching process.

Figure 6:
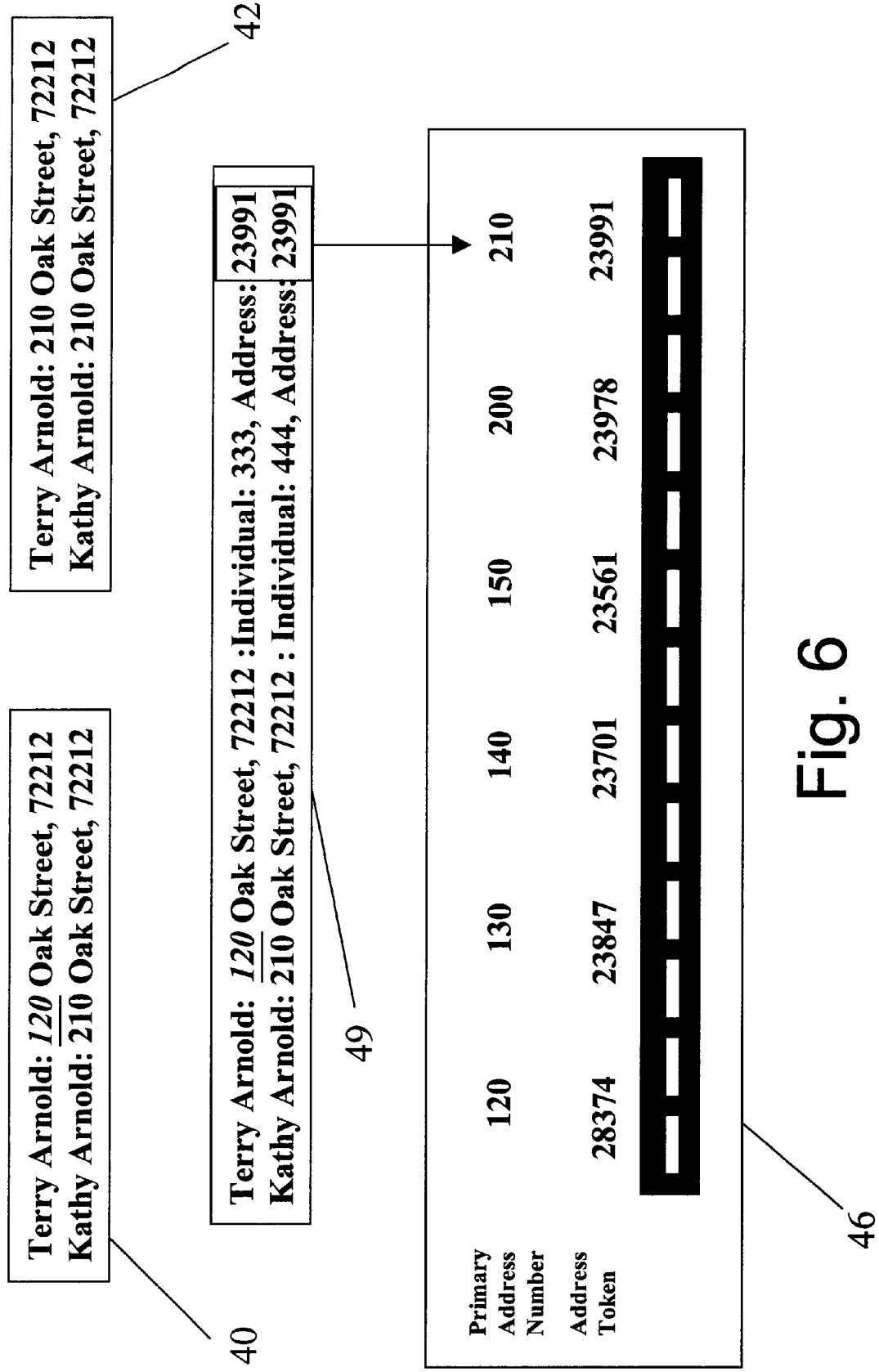
FIG. 6 is a diagram illustrating the procedure for linking customer data despite an error in the address information according to a preferred embodiment of the present invention.

Referring now to FIG. 6, a specific example using the present invention to resolve an address error is described. Erroneous input data 40 contains name and address information for a husband and wife. Erroneous input data 40 contains a typographical error pertaining to the husband; the street address of "210" has been transposed to "120." As shown in delivery map 46, street address "120" does in fact exist. Because the address is valid but is incorrect for this particular consumer, this error would ordinarily be difficult to resolve; for example, simply matching this data against a master address list would not reveal an error. In addition, even though repository data 42 contains the correct data, it would be difficult to match the data without tokens since the "120" street address would not be a part of the husband's address history stored in identification class 30.

Using tokens according to the present invention, however, the problem of matching data with typographical errors may be resolved using matching software 22 because, since matching software 22 performs its function based on occupancy matching rather than either names or addresses alone, the typographical error is ignored in the matching process. This enables the return of resulting data 49 with the correct tokens despite the typographical error. In a similar manner, matching software 22 can draw on the comprehensive data in repository 24 to resolve other address problems, such as address aliases, multiple correct street names, and common misspellings. Alternatively, resulting data 49 may be delivered containing the corrected address information as found in repository 24, based on token linking. In addition, resulting data 49 may be delivered with additional address information missing from input data 40, such as, for example, an apartment number that was not included with erroneous input data 40.

By using address tokens stored in identification classes 30, the present invention may be used to perform householding. A desired objective of many data processing systems is to determine how many customers share the same household. Definitions of a household may vary from business to business. One business may define a household as natural families residing at a single address. Another may consider two unrelated roommates to be a single household. Still another business may treat legally separated couples who reside at separate addresses as a single household in some instances, and as separate households in others.

The use of identification class 30 to assign a common address token 28 to different customers as illustrated in FIGS. 5 and 6, despite street name aliases and other problems, significantly increases the accuracy of householding data. Using the most common definition of household, that is, persons who live at the same address, householding may be performed simply by accessing all data with a common address token 28. The concept of householding can be extended to other definitions by linking identification classes 30 on repository 24 based on other objective data contained in identification classes 30 which is pertinent to separated families, roommates/relative distinctions, name changes which result in common surnames, and similar issues. Tokens 10 with different prefixes 12 may be used to link data according to each household definition. For example, a prefix 12 of "250" may be used for tokens 10 that are used to link all data according to the traditional definition of household, and a prefix 12 of "249" may be used to link all data according to the roommate/relative definition of household. Such tokens 10 may be returned as an additional linked token for each record in resulting data 49, as shown in FIG. 4.

Figure 7:
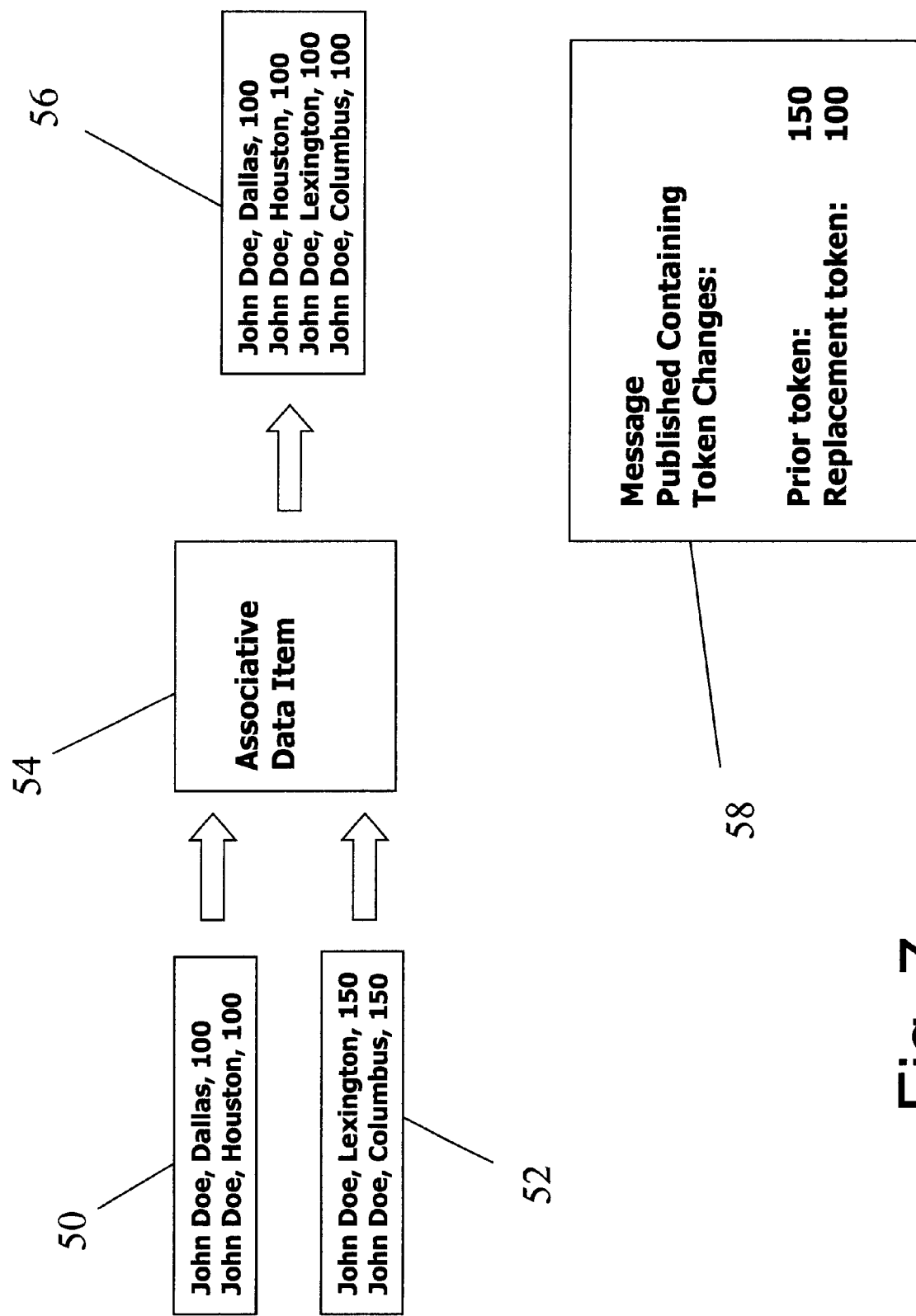
FIG. 7 is a diagram illustrating the procedure for performing token maintenance by consolidating tokens according to a preferred embodiment of the present invention.
Figure 8:
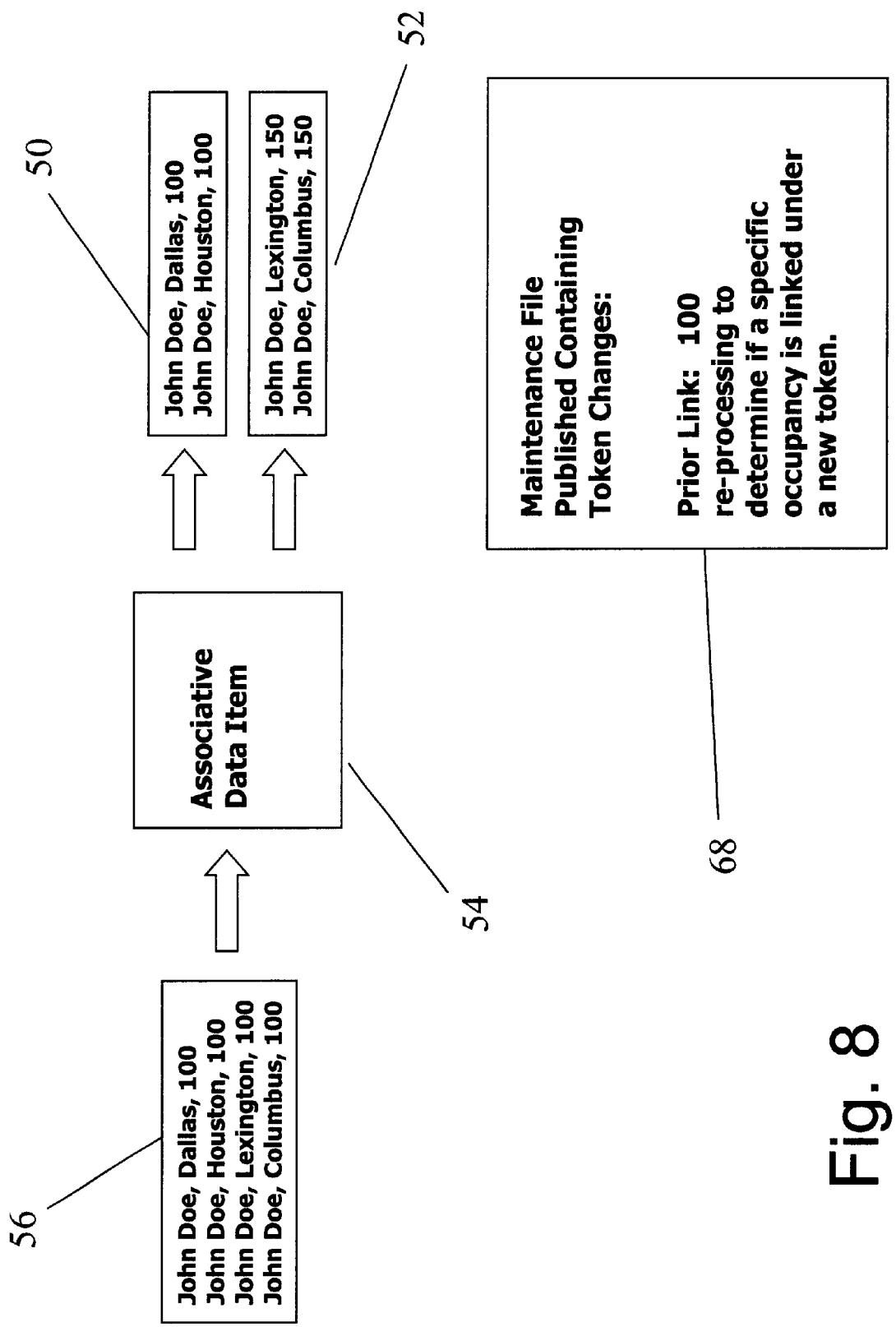
FIG. 8 is a diagram illustrating the procedure for performing token maintenance by splitting tokens according to a preferred embodiment of the present invention.

Referring now to FIGS. 7 and 8, the methods for performing token maintenance according to a preferred embodiment of the present invention are described. While repository 24 contains comprehensive information on the entire population of interest (for example, consumers in the United States), it cannot possibly contain all desired information with respect to all such persons, since such information is constantly in flux. As repository 24 is presented with new consumers and addresses, it must assign a token to link information relevant to those entities. It may occur, however, that as more information is later gathered about that entity, that the entity is in fact an old entity that was already known but, based on the available information in repository 24, could not be resolved into a single entity. The solution to this problem is to consolidate the two tokens into a single token. Likewise, a similar problem occurs when two entities are incorrectly resolved into a single entity, and it is later determined that repository 24 should maintain these as two separate entities using two separate identification classes 30. The solution to this problem is to assign a new token so that a separate token may be used to link data to each of the two entities.

The process of token consolidation and splitting does not require the data owners who have already been supplied with tokens to rebuild or "retokenize" their database. Instead, these data owners are merely provided with an electronic file containing a table of token updates. For example, as illustrated in FIG. 7, repository 24 maintains an identification class 30 for a first consumer 50 and a second consumer 52. These two consumers have different consumer tokens "100" and "150" assigned to link data relevant to them. Suppose then that a new associative data item 54 is entered into repository 24, which indicates that first consumer 50 and second consumer 52 are in fact the same consumer. The result is to merge the identification classes 30 for these two consumers into a single identification class 30 that contains all information relevant to consumer 56. A single consumer token "100" is now used to link all of this information. The other token "150" is now permanently retired from the set of all tokens.

To update data owners concerning this change, the information service provider sends consolidation message 58. Consolidation message 58 informs the data owner that the retired token "150" must now be replaced wherever it occurs with token "100" that had been used with respect to this consumer. The data owner now need simply run a software routine that searches for all occurrences of the retired token and replace it with the new token. The information service provider can send consolidation messages 58 as soon as associative data item 54 is received, or it may send periodic consolidation messages 58 that reflect all token consolidations that have occurred since the last consolidation message 58 was sent.

Turning now to FIG. 8, the process for performing token splits is also illustrated by example. Repository 24 initially contains information that consumer 56 is a single individual, for which all relevant information is contained in an identification class 30, including the single consumer token 26 used to link data relevant to this consumer. Associative data item 54 is then received by repository 24, but in this case associative data item 54 indicates that consumer 56 is in fact two different consumers. A software routine is then performed to split the identification class 30 for consumer 56 into two identification classes, one for first consumer 50 and the other for second consumer 52. While existing consumer token 26 may be used to link data relevant to one of these entities, a new consumer token 26 must be assigned to link data relevant to the other consumer.

To notify data owners concerning a token split, split message 68 is published in a manner similar to that described above for consolidation message 58. Split message 68 and consolidation message 58 may be merged to form a single message that is periodically sent out to data owners. Additional information is required in the case of a split, however, since the data owner must know which data retains the old consumer token, and which data Will be tagged with the new consumer token. Reprocessing will be necessary to determine if a specific occupancy is to be tagged with the new token.

Referring now to FIG. 9, the advantages of performing data updates using a preferred embodiment of the invention are described. The first step to apply the present invention to a data owner's data processing system is to overlay the tokens 10 onto the data owner's data, as explained above. In the example of FIG. 9, customer data 70 contains records from four physically independent databases, totaling 23 million records. Customer data 70 is input into consolidation process 72 and token assignment 74 (these processes are performed by matching software 22, as discussed above, based on data from repository 24). Alternatively, consolidation process 72 may be skipped and data may be fed from each source in customer data 70 directly to token assignment 74. The modified customer data 70, with tokens 10 added to each record, becomes customer file 76. This initial build is resource-intensive, since all 23 million records of the data owner's data must be processed to initially assign tokens 10 to customer data 70.

Suppose now that the data owner wishes monthly updates to its data. Instead of reprocessing all of customer data 70, only update data 78 need be processed. Update data 78 represents that new data that the data owner has acquired in the preceding month. This data may be, for example, new customers the data owner has acquired during the preceding month. In the example of FIG. 9, update data 78 contains only 1.5 million records from two different databases. Update data 78 is input to consolidation process 72 and token assignment 74 (or directly into token assignment 74) as described above with respect to the initial build, and then integrated with customer file 76. Since consolidation process 72 and token assignment 74 are based on information in repository 24, and not on name and address comparisons across all of customer data 70, it is not necessary to reprocess the entire file to perform the update procedure.

The present invention contemplates that updates can be performed as often as desired—monthly, daily, or even in real time as new records are received. Since all of the information necessary for matching is contained in repository 24, and thus customer data 70 is not used for cross-comparison, update data 78 could be a file as small as a single record. In the real-time update environment, just as a new record is received, it is sent as update data 78 to the information service provider, which immediately runs matching software 22 to perform consolidation process 72 and token assignment 74, thereby allowing real-time update of customer file 76. More frequent updates will reduce the volume of each update, and thereby relieve computational resource bottlenecks caused by less frequent processing of large updates. In addition, more frequent or even real-time updates will allow the data owner to maintain the most accurate information concerning all of its customers.

Once the linking tokens are in place in a data owner's databases, one application according to a preferred embodiment of the present invention is data integration. Many businesses today are finding it advantageous to implement "Customer Relationship Management" (CRM) plans. The goal of a CRM plan is for the business to completely understand its relationship with any particular customer. CRM requires that a business integrate all information known about each customer, whether such information is derived from inside or outside sources. This integrated information would ideally be available in real time so that the business may respond immediately to interactions initiated by any given customer. CRM may include, for example, knowing all products and product lines of interest to the customer, knowing the customer's purchasing history with all of the business's various divisions, and knowing the customer's relevant demographic (or, in the case of a business, firmographic) information. Using this type of information, businesses find that they are better able to serve their customers through sales and marketing efforts that are specifically tailored to the interests of a particular customer. Customers find this process desirable as well, since they are alerted to products and offers in which they are interested, but are not solicited to purchase those products or services in which they have not expressed an interest.

The key element of any successful CRM plan is the creation of a "Total Customer View" regarding any particular customer. The total customer view consists of an assimilation of all relevant information for a customer, from any number of disparate information stores, arranged in a manner to facilitate CRM. The principal obstacle facing a business attempting to build a total customer view system is that the business's information stores usually contain overlapping information about the same customer that is not equally consistent, accurate, and current. As a result, information concerning the same individual may reside in multiple databases or information stores with various inconsistencies. Because each of these data stores may use a different customer numbering scheme, or may rely merely on name and address matching, successfully linking this data together using only internal information is difficult, and cannot be performed with a high level of accuracy.

FIG. 10 provides an illustrative example of this problem. Each row of company data table 80 represents a record pulled from a different database maintained by one of a retailer's various divisions. Each column of company data table 80 represents a particular field in these records, such as name, address, and customer account number. The information in this case is pulled from four different databases maintained by the retailer—automotive services, home services, retail sales, and the sporting goods "special mailing list." Although the records from each database actually represent the same individual, the variations in name spelling, the individual's change of address, and the different account numbers used by each division would make it impossible to match this data together using internally-generated matching routines. The retailer would thus be unable to determine that this is a single individual, rather than four different individuals, and would therefore be unable to build an accurate total customer view.

Referring now to FIG. 11, the result of using tokens to match this information is illustrated with linked data table 90. In linked data table 90, each record on the company's various databases has been augmented with the appropriate tokens. Repository 24, which contains all of the variant name spellings and address history for customer William F. Smith, will be able to resolve that each of these records contains information referring to the same individual. Once the records are "tagged" with the proper tokens, the retailer may quickly and easily link all of its data concerning this individual through a simple token matching process. The retailer can also quickly and easily link to information about this customer that is maintained by an external information services provider, thereby allowing update or enhancement of the retailer's data.

Figure 12:
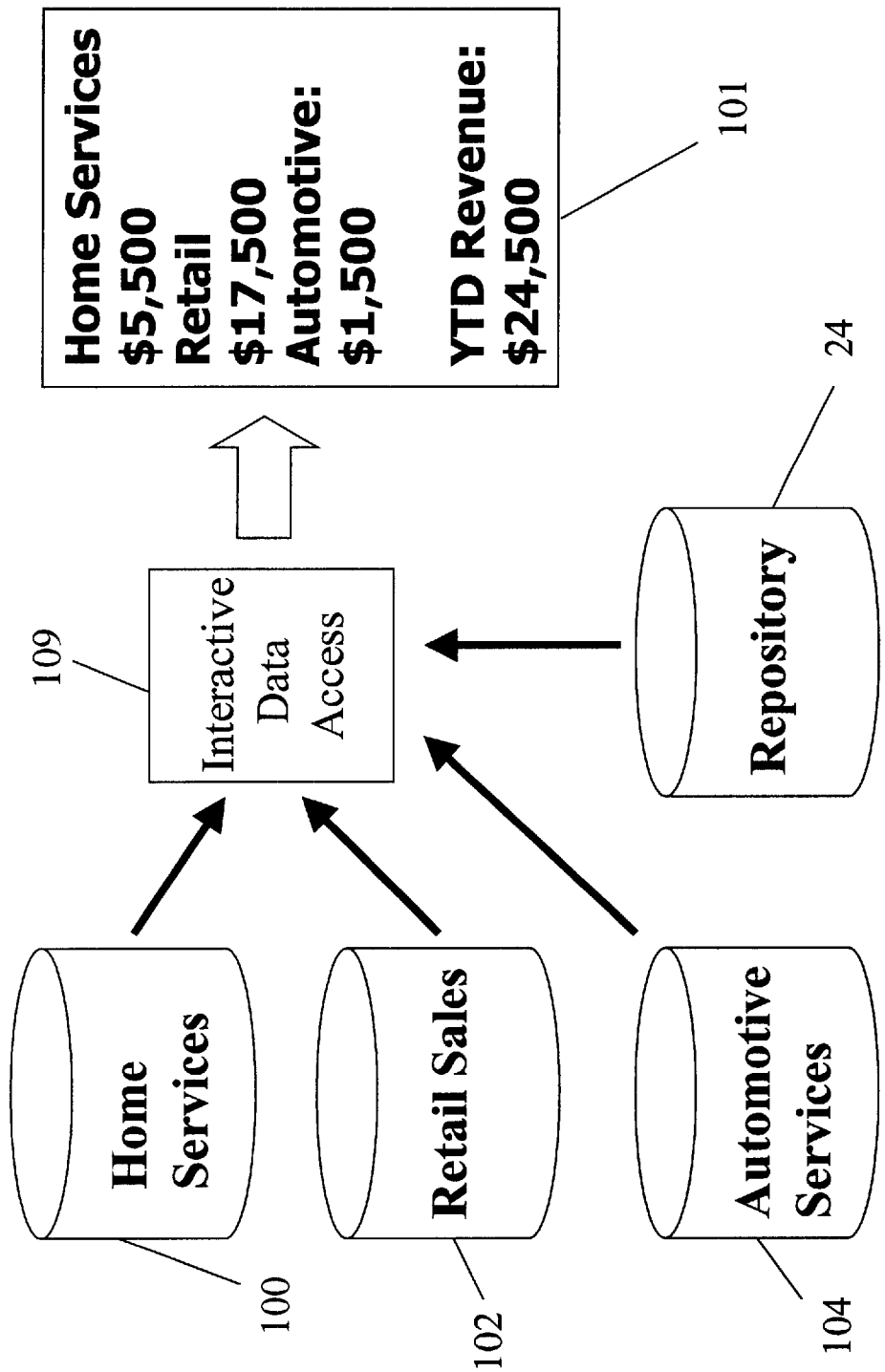
FIG. 12 is a diagram illustrating a method of building a total customer view using tokens according to a preferred embodiment of the present invention.

Referring now to FIG. 12, the method for constructing a total customer view for customer William F. Smith is illustrated. The information accumulated by each of the retailer's divisions has been tagged with the consumer token 26 for William F. Smith—this information is contained in home services database 100, retail sales database 102, and automotive services database 104. By using interactive data access routine 109, the retailer may search for all data relevant to customer William F. Smith merely by searching for the consumer token 26 used to link that data, and retrieving all records tagged with that token. In addition, the retailer can also connect to repository 24 maintained by the information service provider to pull additional information concerning customer William F. Smith as desired. Because this token-matching process is computationally simple, it may be performed in real time. The result is total customer view 101, through which the retailer may immediately determine its total relationship with this customer. The total customer view 101 may, for example, enable the retailer to direct its marketing efforts toward this particular customer in a more efficient manner by concentrating on products and services that this customer is known to favor.

Figure 13:
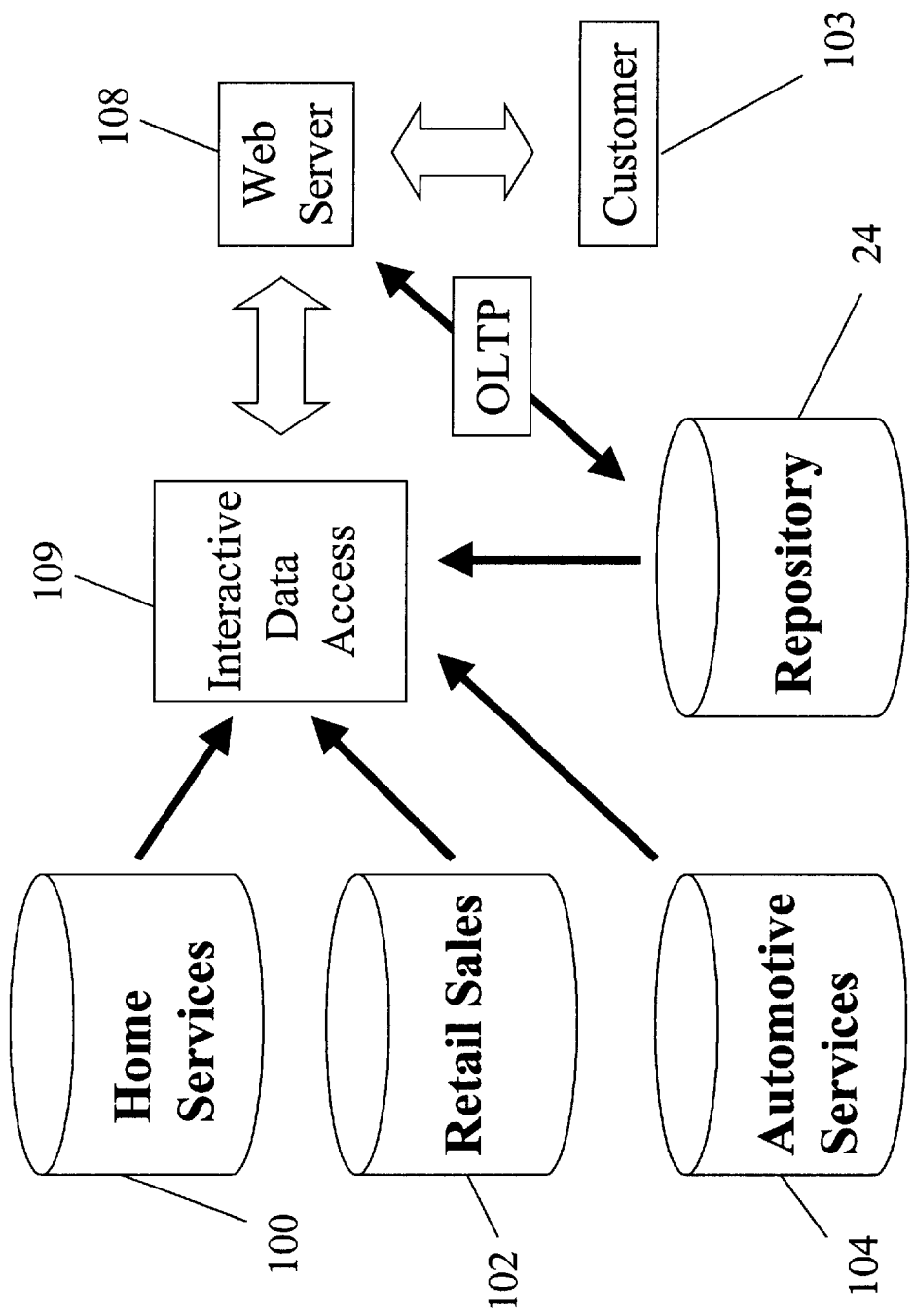
FIG. 13 is a diagram illustrating a method of responding to consumer input to build a customized web page using tokens according to a preferred embodiment of the present invention.

The process illustrated in FIG. 12 and described above may be applied to several important tasks relevant to customer relationship management. FIG. 13 illustrates the example of a customer 103 contacting a large retailer through the-retailer's Internet web site. Suppose that customer 103 decides to order rain gutters for his home. He then accesses the Internet web site the retailer maintains to facilitate e-commerce. which is hosted on web server 108. Upon accessing the web site, the customer is prompted to enter his name and address by the software maintained on web server 108. Web server 108 then determines the consumer token 26 used to link information concerning customer 103. Once a match is found, then interactive data access 109 may search all of the retailer's various databases for matches to this token, including home services database 100, retail sales database 102, and automotive services database 104. This data is then returned to web server 108. Again, since matching is performed using tokens, this process will return all relevant data concerning customer 103 regardless of whether there is a match between a particular record containing relevant information and the name and address entered by the customer in response to the query of web server 108. In addition, the token may be used to retrieve additional information from an information services provider's repository 24 in real time through a connection with repository 24. Linkage with the repository 24 may preferably be by OLTP techniques. The combined data of the retailer and information services provider may then be used by web server 108 to immediately build a customized Internet web page for viewing by customer 103. This customized web page may, for example, display special promotions particularly of interest to that customer. This entire process may, in a preferred embodiment of the invention, be performed in real time and will thus not result in noticeable delay for customer 103.

In an alternative embodiment of the present invention, a data owner may provide a customized web page for viewing by customer 103 by sending customer 103's response to the query by web server 108 directly to an information service providers repository 24. The information service provider then uses this information, in conjunction with the data in repository 24, to find the appropriate consumer token 26 to match all relevant information about customer 103. If additional information from the information service provider is requested, that data can be returned along with the appropriate consumer token 26 to web server 108. This consumer token 26 may then be used to match all information the retailer maintains about customer 103 using interactive data access 109 as explained above. This aggregate of data may then be used by web server 108 to construct a customized web site for customer 103. This aggregate of data may also, in an alternative embodiment, be transmitted to an analytical modeling engine (not shown) to perform data mining and other analytical functions, the results of which may be returned to web server 108 to assist in constructing a customized web site for customer 103.

The present invention may allow a retailer to use a customer transaction or input as an opportunity to update its data concerning that customer. Again referring to FIG. 13, suppose that customer 103 has recently moved from Jacksonville to Phoenix. Customer 103 then decides that his new home needs rain gutters, and he attempts to order them over the Internet through the retailer's e-commerce web site. Suppose once again that web server 108 prompts customer 103 for name and address information. None of the retailer's internal databases will contain customer 103's new address, and thus it may be difficult to accurately link all information about customer 103 without tokens. If the name and address is sent to the information services provider, however, it may use repository 24 to return to web server 108 the correct consumer token 26 and address token 28 for customer 103, provided that the repository 24 has previously received data indicating the move. The retailer can then use token matching to retrieve all of its data that is relevant to this customer using data access routine 109, and can then use web server 108 to build a customized web page for customer 103 based on this information. The updated address information provided by customer 103 can be used by the retailer to later mail coupons and special offers directed to customer 103 at his correct address.

Figure 14:
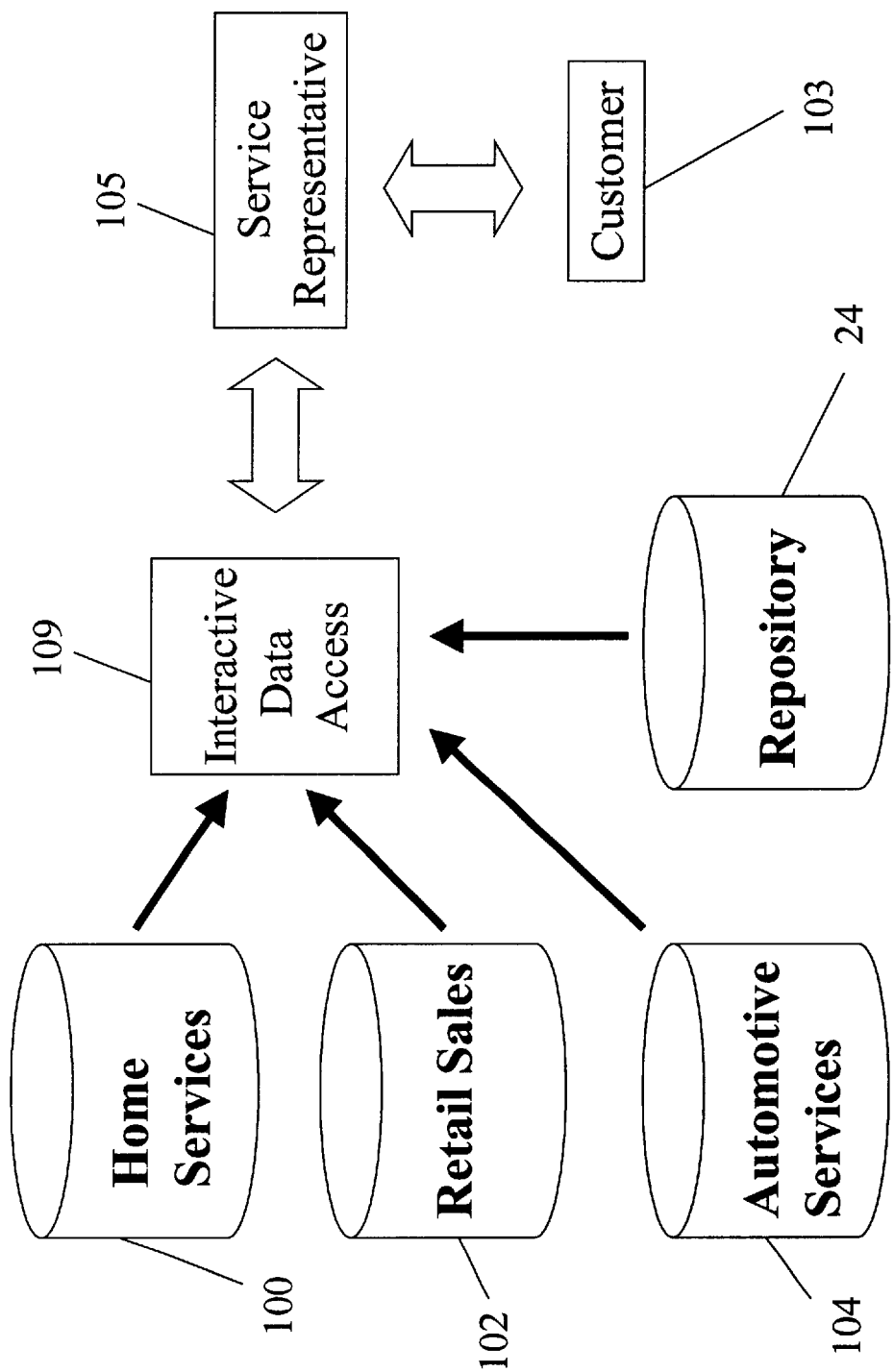
FIG. 14 is a diagram illustrating a method of improving call center response using tokens according to a preferred embodiment of the present invention.

Still another example will illustrate how tokens 10 facilitate another important aspect of customer relationship management. Referring now to FIG. 14, suppose that customer 103 calls service representative 105 to complain that the rain gutters he ordered were not delivered on time. Service representative 105 may then immediately call up all available information concerning customer 103 using interactive data access routine 109. As a result, service representative 105 will be able to determine that customer 103 has done substantial business with the retailer in the recent past, and usually purchases sporting goods. By recognizing these facts while still speaking to customer 103, service representative 105 may determine that the best course of action is to offer customer 103 a coupon for a significant discount on his next sporting goods purchase. By having access to all available information concerning customer 103, the retailer is thus able to determine the best method of retaining customer 103 in spite of a poor service event in one particular transaction.

Figure 15:
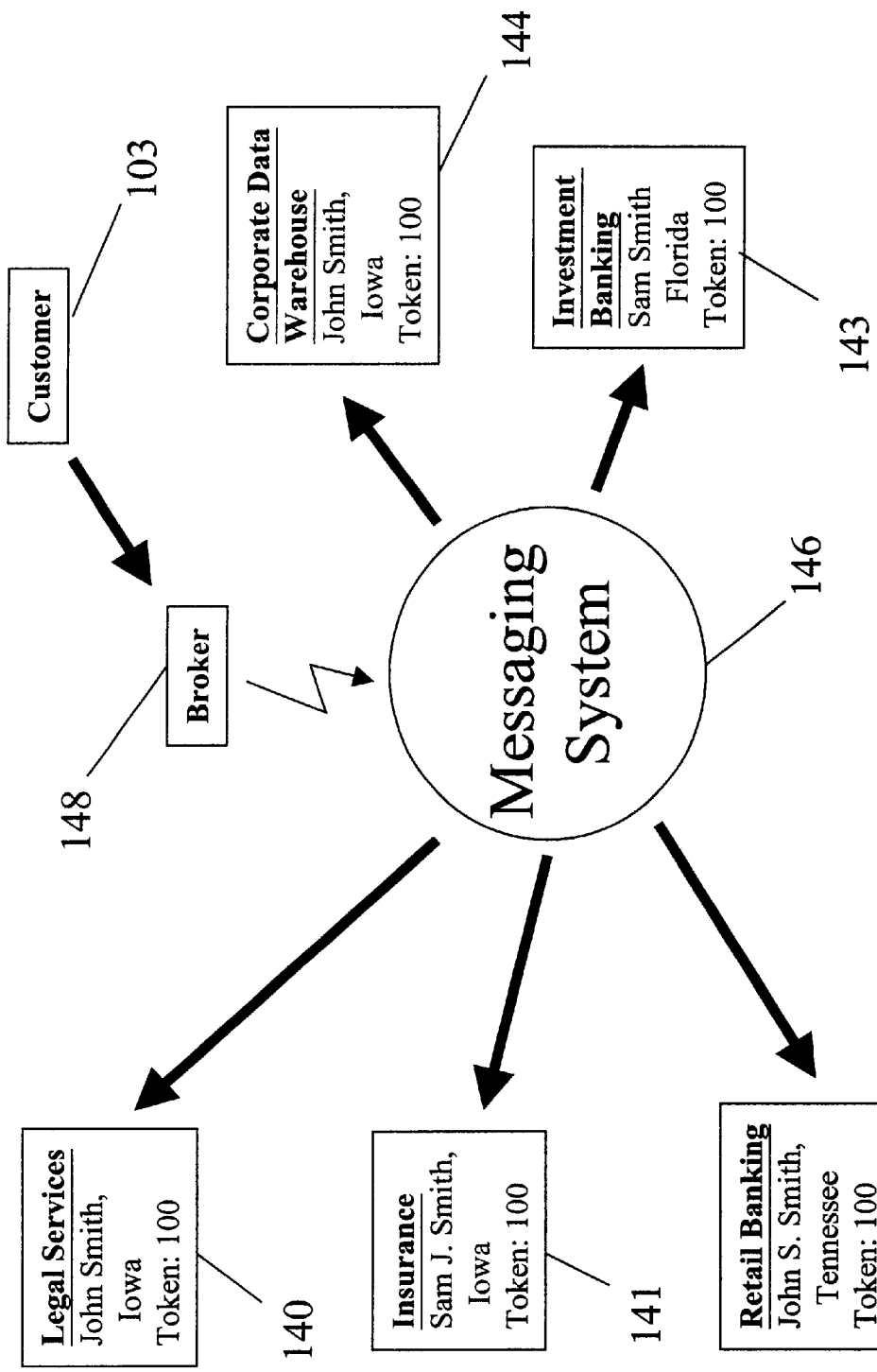
FIG. 15 is a diagram illustrating "trigger notification" customer relationship management using tokens according to a preferred embodiment of the present invention.

The present invention also may be used to perform trigger notification throughout the various databases maintained by a data owner. For example, this process is illustrated in FIG. 15 for a large financial institution. The financial institution maintains physically separate databases for its various operations, including legal services database 140, insurance database 141, retail banking database 142, investment banking database 143, and corporate data warehouse 144. Broker 148 learns from customer 103 that he is planning to purchase a new home. This information may be valuable to other divisions of the financial institution, such as retail banking and legal, who may wish to offer their services to customer 103 in connection with this transaction. Broker 148 may enter this information into messaging system 146, which then uses matching tokens to immediately provide this information to legal services database 140, insurance database 141, retail banking database 142, investment banking database 143, and corporate data warehouse 144. Persons operating in the legal and retail banking divisions will how have access to this information, and may retrieve any additional information maintained about customer 103 through data integration using tokens as illustrated above.

Figure 16:
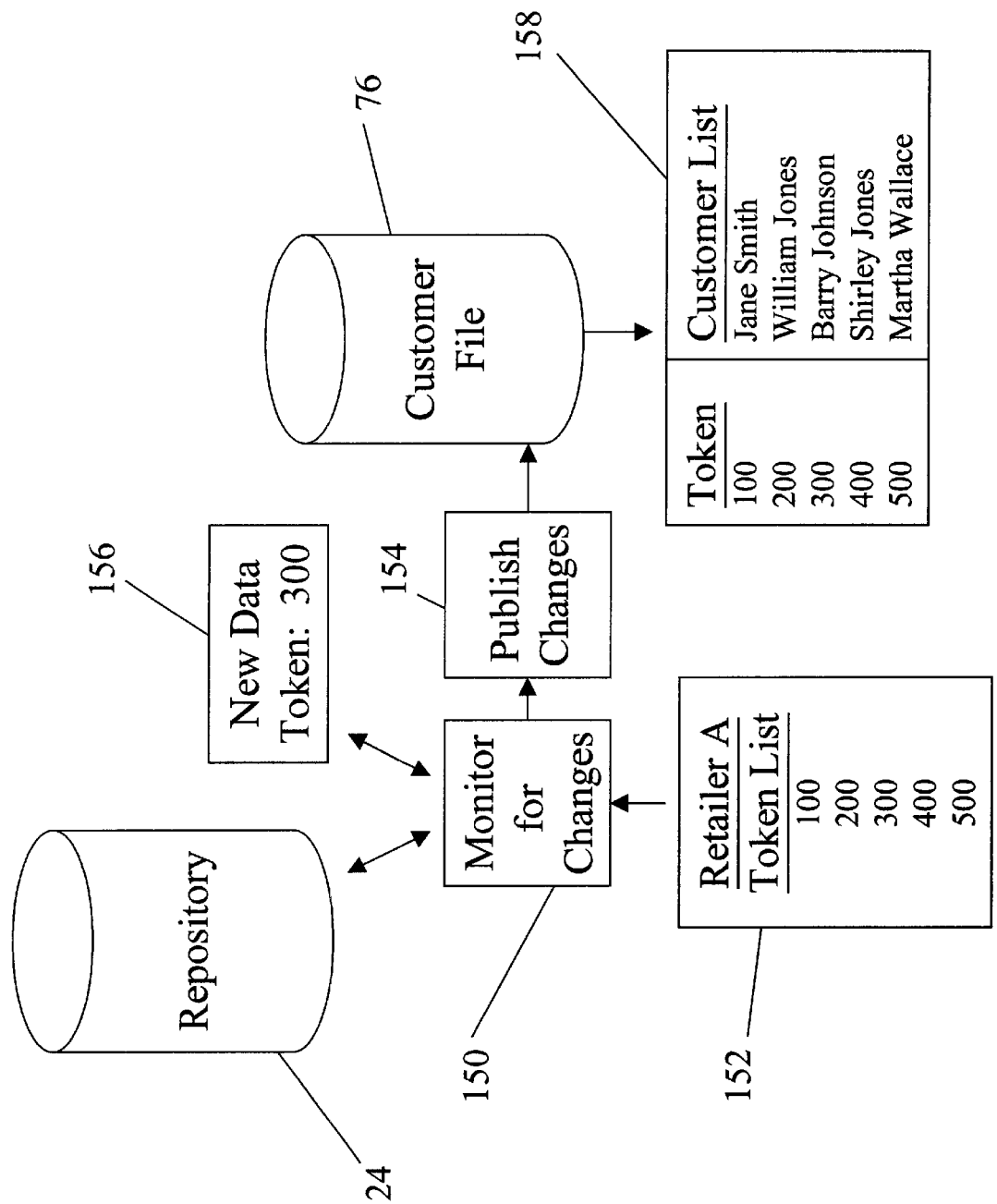
FIG. 16 is a diagram illustrating the use of "push" technology using tokens according to a preferred embodiment of the present invention.

Still another application of the present invention is to update or enhance data on a customer file 76 not in response to input from the entity about which information is maintained, but instead as new information is added to the data service provider's repository 24. The new information may be automatically "pushed" to those data owners who maintain records concerning the entity to which the information pertains and who wish to receive this service. Referring now to FIG. 16, an example of push technology using tokens is illustrated. Suppose repository 24 is updated with additional information about a particular customer in the form of update data 156. Retailer A also maintains information about the customer to which this data pertains on its customer file 76, which may be, for example, a database maintained at retailer A's home office data center. Since retailer A has previously subscribed to the push service, the information service provider maintains retailer A tokens list 152, containing a list of all tokens 10 corresponding to entities for which retailer A desires push updates. The information service provider's monitor routine 150 checks retailer A token list 152 to determine if update data 156 should be pushed to customer file 76. Assuming that other data owners subscribe to the push service, monitor routine 150 would check the token list associated with each of these subscribers as well. This process may be performed quickly because monitor routine 150 need only compare the token in update data 156 with the tokens in each token list. Once monitor routine 150 finds a match in retailer A token list 152, it will then pass update data 156 to publish routine 154, which will then communicate update data 156 to retailer A's customer file 76. This communication may be by telephone line or any other means of transmitting data electronically. The result in customer file 76 is updated customer list 158. By subscribing to the push service, retailer A may take advantage of the information service provider's vast resources and access to a nationwide database of information, while at the same time paying only for updates to data that is relevant to its business as reflected by that information maintained in customer file 76 and retailer A token list 152.

We claim:

1. A system for linking data comprising:

(a) at least one client data storage system;

(b) a plurality of data elements resident on said data storage system for an indefinite time, wherein each of said data elements comprises data that pertains to a particular entity, wherein each of said entities comprises one of a consumer, a business, a household, and an occupancy;

(c) a master repository;

(d) a plurality of identification classes resident on said repository, each of said identification classes corresponding to a particular entity, each of said identification classes comprising at least one of name aliases, name change history, address aliases, address change history, alternate name and address spellings, and common name and address misspellings, and wherein said repository contains identification classes pertaining to substantially all of said entities located within a particular geographic area; and (e) a plurality of tokens resident on said repository, wherein each of said tokens uniquely corresponds to a particular entity, wherein the unique correspondence of each of said tokens to a particular entity is persistent over time, and wherein each of said identification classes is tagged with that one of said tokens corresponding to the entity to which each said identification class pertains.

2. The system of claim 1, wherein each of said tokens comprises:

(a) a prefix representing the type of entity to which said token corresponds; and (b) a unique number.

3. The system of claim 1, wherein each of said data elements that pertains to a consumer is tagged with that one of said tokens that corresponds to the consumer.

4. The system of claim 3, wherein each of said data elements that pertains to a consumer is also tagged with at least one of said tokens that corresponds to an address associated with that consumer.

5. The system of claim 3, wherein at least one of said data elements that pertains to a consumer is also tagged with at least one of said tokens that corresponds to an occupancy associated with that consumer.

6. The system of claim 3, wherein at least one of said data elements that pertains to a consumer is also tagged with at least one of those of said tokens that correspond to a household associated with that consumer.

7. The system of claim 1, wherein each of said data elements that pertains to an address is tagged with that one of said tokens that corresponds to the address.

8. The system of claim 7, wherein each of said data elements that pertains to an address is also tagged with at least one of said tokens that corresponds to a consumer associated with that address.

9. The system of claim 1, wherein said at least one data storage system comprises a plurality of physically remote databases.

10. The system of claim 9, wherein at least two of said physically remote databases contain data elements pertaining to the same entity.

11. A method of integrating data, comprising the steps of:

(a) creating a set of identification classes, wherein each of the identification classes comprises data pertaining to an entity, each of the identification classes comprises at least one of name aliases, name change history, address aliases, address change history, alternate name and address spellings and common name and address misspellings, wherein each entity comprises one of a consumer, a business, a household, and an occupancy, and wherein the set of identification classes comprises identification classes comprising data pertaining to substantially all of the entities located within a geographic area;

(b) storing the set of identification classes on a master repository;

(c) creating a set of tokens, wherein each of the tokens uniquely matches to a particular one of the entities, and wherein the unique matching of each of the tokens to a particular one of the entities is persistent over time;

(d) associating each of the identification classes on the repository with that one of the tokens that is matched to the one of the entities to which each of the identification classes pertains;

(e) building a transfer file from a client data storage system, wherein said transfer file comprises a plurality of data elements, and wherein each of the plurality of data elements is resident on the data storage system;

(f) transmitting the transfer file to the repository;

(g) matching each of the data elements in the transfer file to the corresponding identification class;

(h) tagging each of the data elements in the transfer file with at least one of the tokens contained in the identification class matched to that data element;

(i) rebuilding the data storage system using the data elements and tokens in the transfer file; and (j) collecting all data elements resident on the data storage system that are tagged with a particular token by searching for the particular token across the data storage system.

12. The method of claim 11, wherein the data contained in each of the identification classes comprises at least one of name aliases, name change history, address aliases, address change history, alternate name spellings, and common name misspellings, and said matching step comprises the matching of the data elements to at least one of name aliases, name change history, addresses aliases, address change history, alternate name spellings, and common name misspelling in the identification class corresponding to each data element.

13. The method of claim 11, wherein said tagging step comprises tagging each of the data elements that pertains to a consumer with that one of the tokens that corresponds to the consumer.

14. The method of claim 13, further comprising the step of tagging each of the data elements that pertains to a consumer with at least one of the tokens that corresponds to an address associated with that consumer.

15. The method of claim 13, further comprising the step of tagging at least one of the data elements that pertains to a consumer with at least one of the tokens that corresponds to an occupancy associated with that consumer.

16. The method of claim 13, further comprising the step of tagging at least one of the data elements that pertains to a consumer with at least one of those of said tokens that correspond to a household associated with that consumer.

17. The method of claim 11, further comprising the step of tagging each of the data elements that pertains to an address with that one of the tokens that corresponds to the address.

18. The method of claim 17, further comprising the step of tagging each of the data elements that pertains to an address with at least one of the tokens that corresponds to a consumer associated with that address.

19. The method of claim 11, wherein said collecting step is performed in real time.

20. The method of claim 19, wherein said collecting step is performed in response to consumer input.

21. The method of claim 20, wherein the consumer input comprises one of a consumer purchase and consumer access to an Internet web page.

22. The method of claim 11, wherein said collecting step comprises the collection of data elements pertaining to a single entity at a time.

23. The method of claim 11, further comprising the step of transmitting from the repository to the data storage system additional data contained in the identification class corresponding to the matched data elements.

24. The method of claim 23, wherein the additional data transmitted from the repository to the data storage system comprises demographic data.

25. The method of claim 23, wherein the additional data transmitted from the repository to the data storage system comprises at least one of standardized address and complete address data.

26. The method of claim 23, wherein the additional data transmitted from the repository to the data storage system comprises at least one of standardized name, most-used name, and formal name data.

27. The method of claim 11, wherein said matching and tagging steps are performed through an OLTP link between the data storage system and the repository.

28. A method of integrating a plurality of data elements resident on a data storage system wherein each of the data elements pertains to a particular entity, comprising the steps of:

(a) building a transfer file comprising the data elements;

(b) transmitting the transfer file to a repository, wherein a plurality of identification classes are resident on the repository, each of said identification classes corresponding to a particular entity, each of said identification classes comprising at least one of name aliases, name change history, address aliases, address change history, alternate name and address spellings, and common name and address misspellings, and wherein said repository contains identification classes pertaining to substantially all of said entities located within a particular geographic area, and wherein each of said identification classes further comprises:

(i) at least one token, wherein each token uniquely corresponds to a particular entity; and (ii) data relevant to the entity to which the token corresponds;

(c) matching each of the data elements in the transfer file to the corresponding identification class;

(d) tagging each of the data elements in the transfer file with at least one of the tokens contained in the identification class matched to that data element;

(e) rebuilding the data storage system using the data elements and tokens in the transfer file;

(f) collecting all data elements resident on the data storage system that are tagged with a particular token by searching for the particular token across the data storage system;

(g) building a token maintenance file, comprising at least one of a list of all tokens that should be consolidated into one token and a list of all tokens that should be split into a plurality of tokens;

(h) transmitting the maintenance file from the repository to the data storage system; and (i) updating the tokens in the data storage system using the maintenance file.

29. A method of constructing a total customer view using a data processing system, wherein at least one data element is resident on the data processing system, and each data element is tagged to the token corresponding to the entity to which the data element pertains, comprising the steps of:

(a) receiving a request for the total customer view, comprising the steps of:

(i) providing access to the data processing system via a communications network, wherein the communications network comprises a phone line and a magnetic device reader, and the input data comprises data stored on a magnetically encoded device;

(ii) receiving a customer input data via the communications network, wherein the input data corresponds to at least one of the data elements;

(iii) matching the input data to one of the data elements to which it depends by utilizing a set of identification classes, wherein each of the identification classes comprises data pertaining to a particular entity, each of the identification classes comprises at least one of name aliases, name change history, address aliases, address change history, alternate name and address spellings, and common name and address misspellings, wherein each entity comprises one of a consumer, a business, a household, and an occupancy, and wherein the set of identification classes comprises identification classes comprising data pertaining to substantially all of the entities located within a geographic area; and (iv) returning the token tagged to the data element matched to the input data;

(b) matching the token corresponding to the customer with the token tagged to all data elements pertaining to the customer;

(c) retrieving all data elements to which the token corresponding to the customer is tagged;

(d) forming the total customer view based on at least one of the retrieved data elements; and (e) transmitting at least one of discount offers, coupons, and merchandise sale notices to the customer, wherein the selection algorithm for the at least one of discount offers, coupons, and merchandise sale notices uses the total customer view.

30. A method of constructing a total customer view using a data processing system, wherein at least one data element is resident on the data processing system, and each data element is tagged to the token corresponding to the entity to which the data element pertains, comprising the steps of:

(a) receiving a request for the total customer view;

(b) matching the token corresponding to the customer with the token tagged to all data elements pertaining to the customer;

(c) retrieving all data elements to which the token corresponding to the customer is tagged;

(d) forming the total customer view based on at least one of the retrieved data elements;

(e) transmitting the token corresponding to the customer from the data storage system to a repository, wherein a plurality of identification classes are resident on the repository, each of the identification classes is tagged with at least one token, each of the identification classes comprises data pertaining to a particular entity, each of the identification classes comprises at least one of name aliases, name change history, address aliases, address change history, alternate name and address spellings, and common name and address misspellings, wherein each entity comprises one of a consumer, a business, a household, and an occupancy, and wherein the set of identification classes comprises identification classes comprising data pertaining to substantially all of the entities located within a geographic area;

(f) matching the token to the identification class that is tagged with that token;

(g) retrieving additional data from the matched identification class;

(h) transmitting from the repository to the data processing system the additional data, linked to the token corresponding to the identification class from which the additional data was retrieved;

(i) adding at least a portion of the additional data to the total customer view; and (j) transmitting the retrieved data elements and the additional data from the repository to an analytical engine.

* * * * *